United States Patent [19]

Shinohara

[11] Patent Number: 4,919,524
[45] Date of Patent: Apr. 24, 1990

[54] VARIABLE FOCUS LENS FOR IMAGE REPRODUCTION

[75] Inventor: Hiroichi Shinohara, Yokohama, Japan

[73] Assignee: Ricoh Company, Ltd., Tokyo, Japan

[21] Appl. No.: 337,555

[22] Filed: Apr. 13, 1989

[30] Foreign Application Priority Data

Apr. 13, 1988 [JP] Japan .................................. 63-90894

[51] Int. Cl.$^5$ ............................................. G02B 9/00
[52] U.S. Cl. ..................................... 350/450; 350/463
[58] Field of Search ................ 350/449, 450, 463, 464

[56] References Cited

U.S. PATENT DOCUMENTS 3,973,831 8/1976 Minoura .............................. 350/463
4,406,522 9/1983 Conrad ................................ 350/450

FOREIGN PATENT DOCUMENTS 61-198205 6/1986 Japan .
62-123421 3/1987 Japan .

*Primary Examiner*—P. M. Dzierzynski
*Attorney, Agent, or Firm*—Oblon, Spivak, McClelland, Maier & Neustadt

[57] ABSTRACT

A variable focus lens for use in reproducing images includes first, second, third, and fourth lens groups arranged successively from an object to an image, and a diaphragm disposed between the second and third lens groups. The first lens group comprises a concave meniscus lens with its concave surface facing the object. The second lens group comprises a double convex lens with the larger absolute value of the radius of curvature of its surface facing the image, a double concave lens with the larger absolute value of the radius of curvature of its surface facing the object, and a double convex lens, the lenses being arranged successively in the order named from the object. The third lens group is of the same construction as the second lens group except that the lenses of the third lens group are arranged and faced in the opposite direction to the second lens group, the second and third lens groups being positioned symmetrically with respect to the diaphragm. The fourth lens group comprises an lens identical to the lens of the first lens group and faced in the opposite direction to the first lens group, the first and fourth lens groups being positioned symmetrically with respect to the diaphragm. The first and fourth lens groups and the diaphragm are fixed, whereas the second and third lens groups are movable, the first through fourth lens groups being positioned symmetrically with respect to the diaphragm at an equal-size magnification ratio.

1 Claim, 37 Drawing Sheets

FIG. 2  M = -1.0
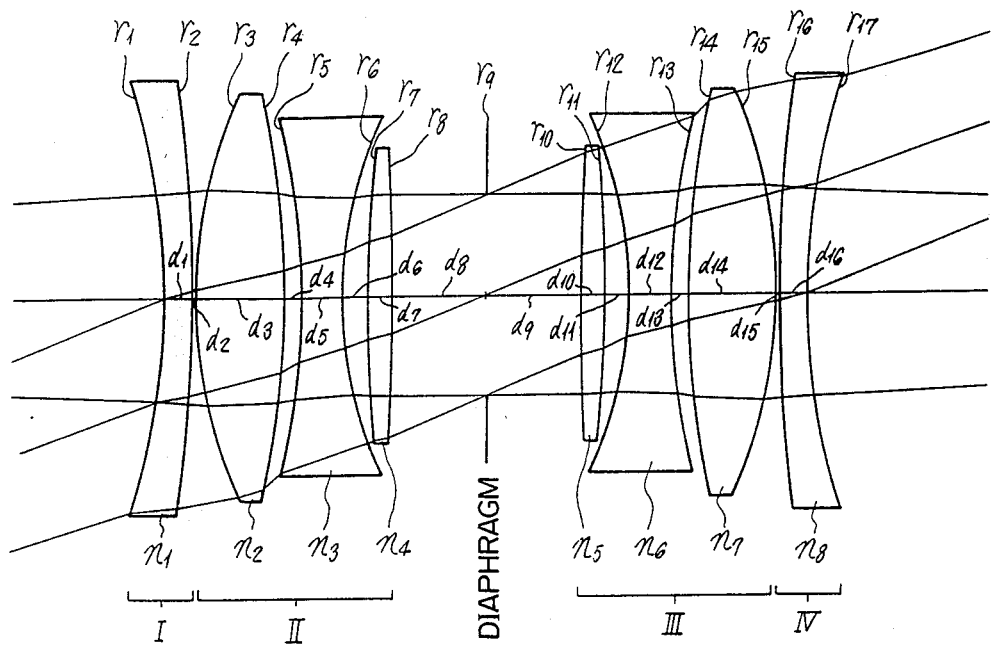
FIG. 5  M = -0.5
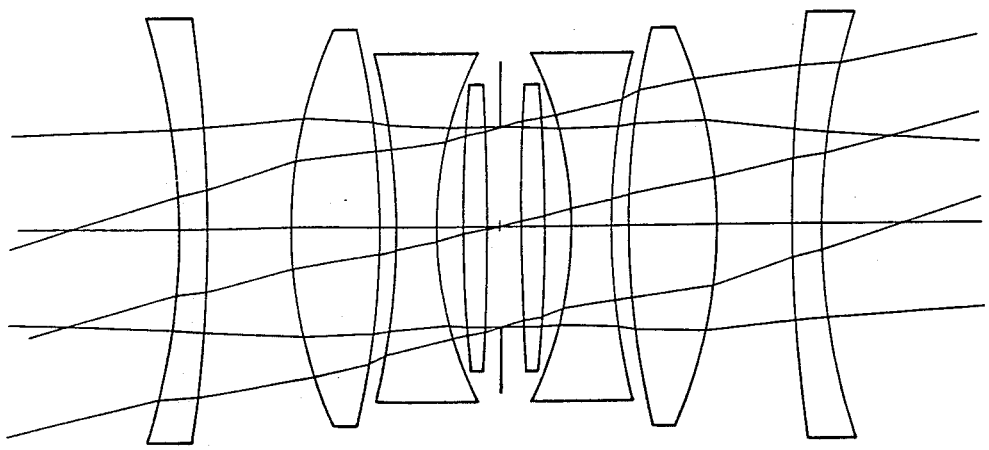

F I G. 8   M = -2.0
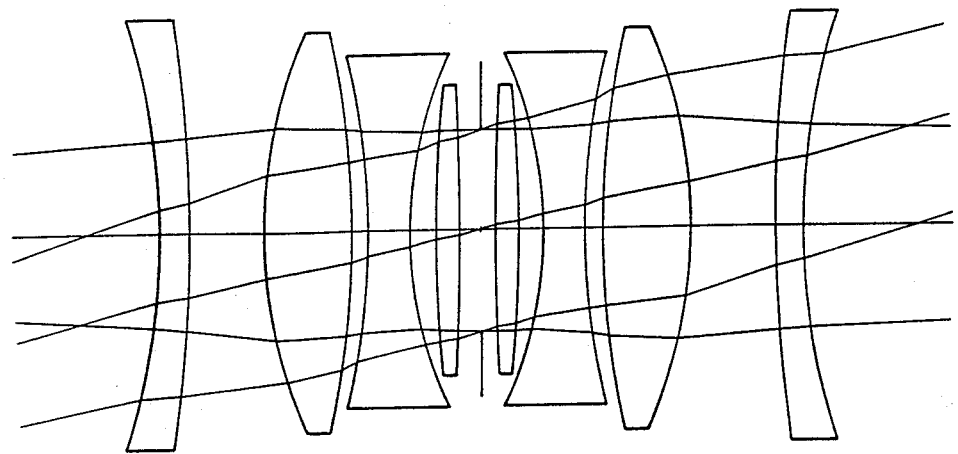
F I G. 11   M = -1.0
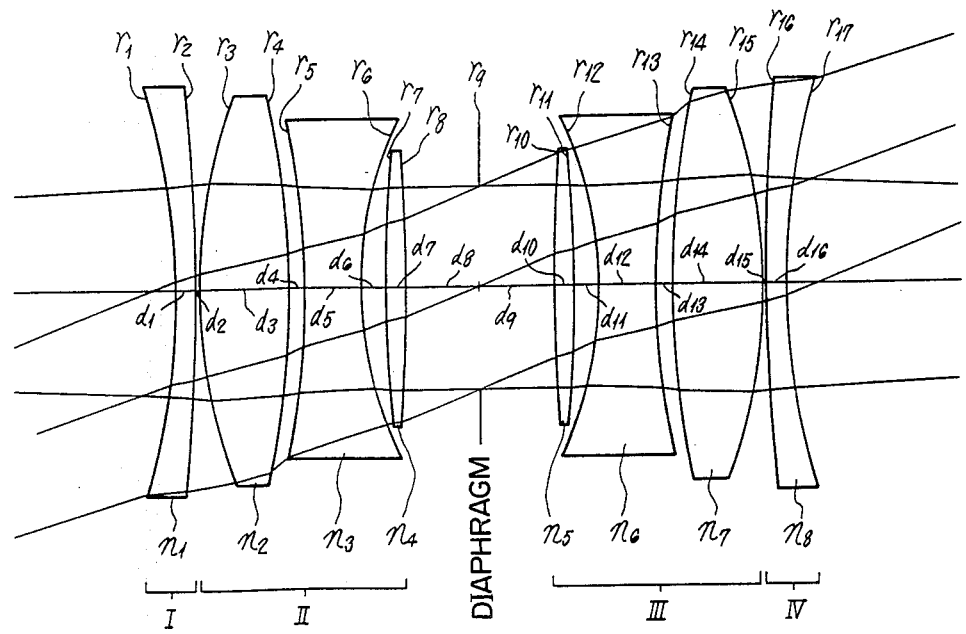

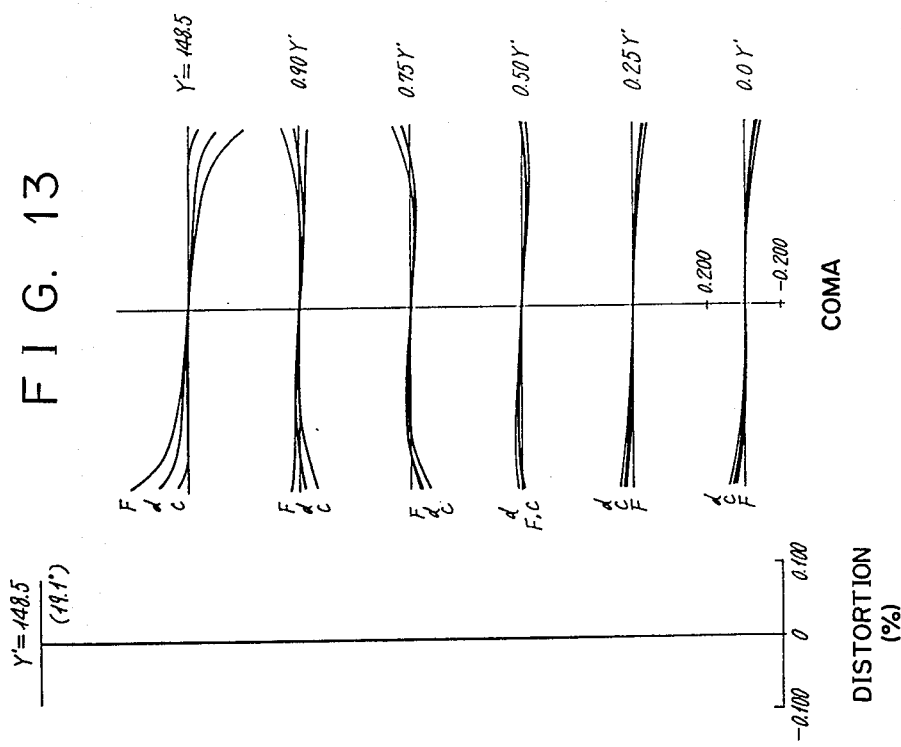
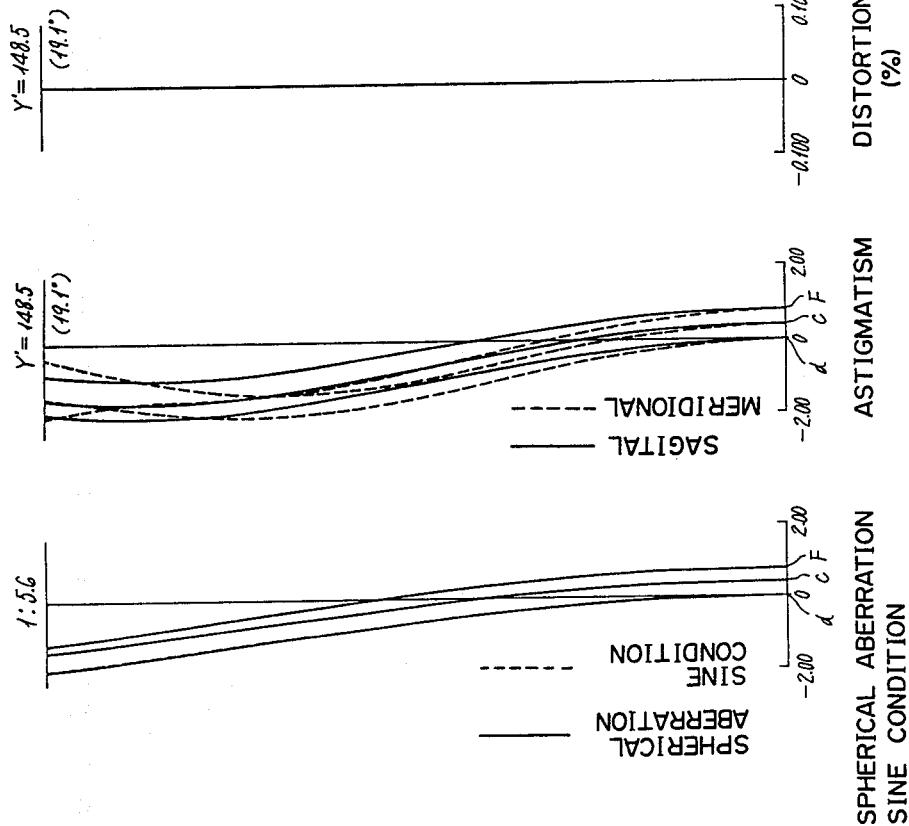

FIG. 14  M = -0.5
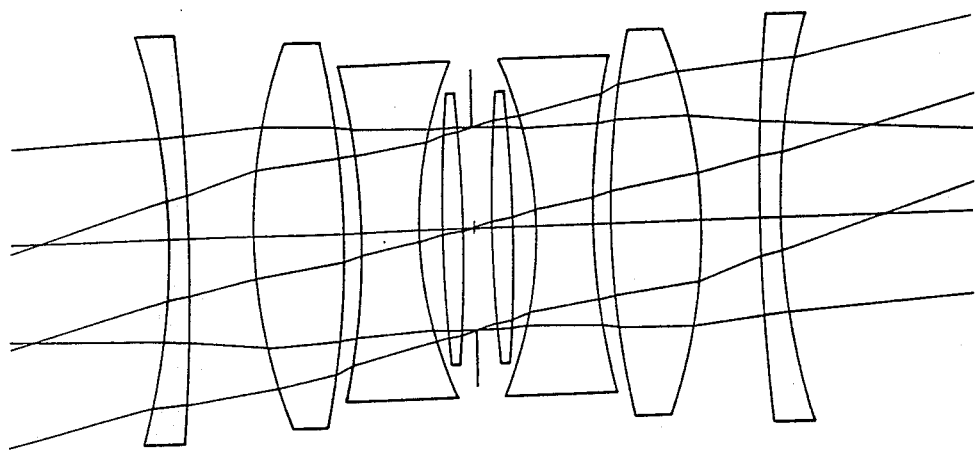
FIG. 17  M = -2.0
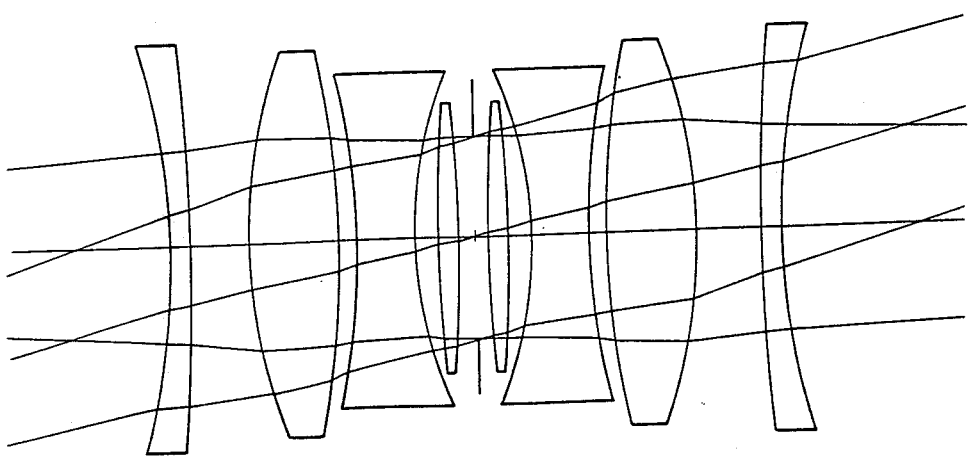

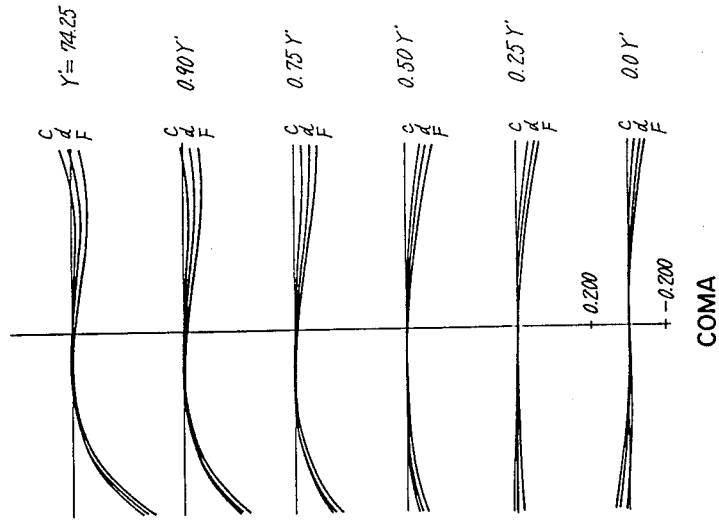
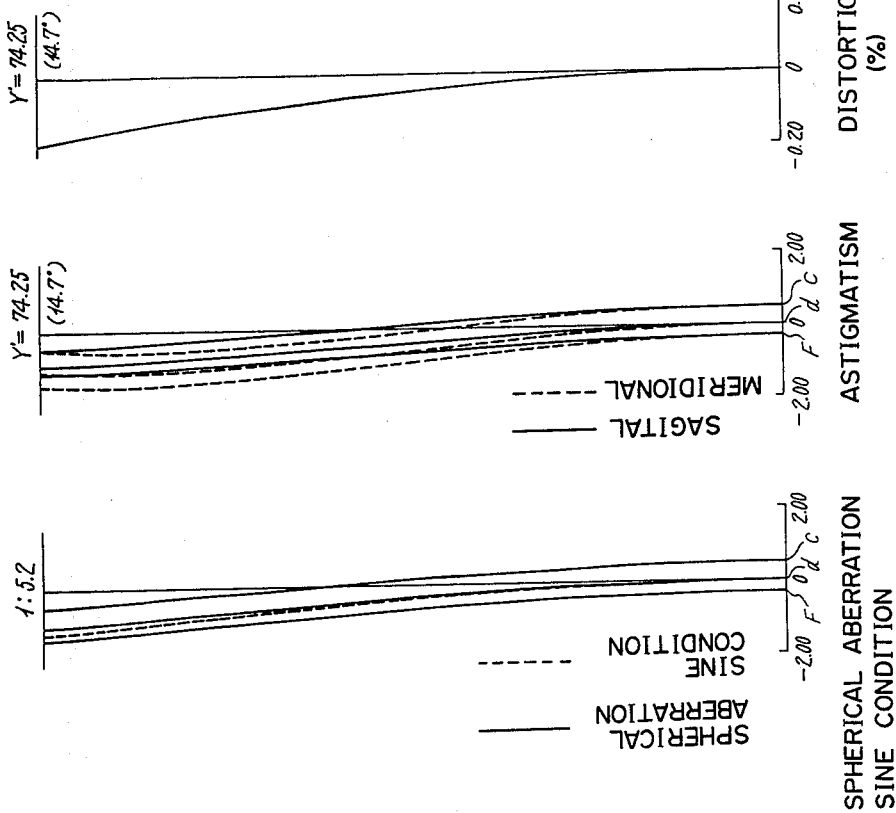

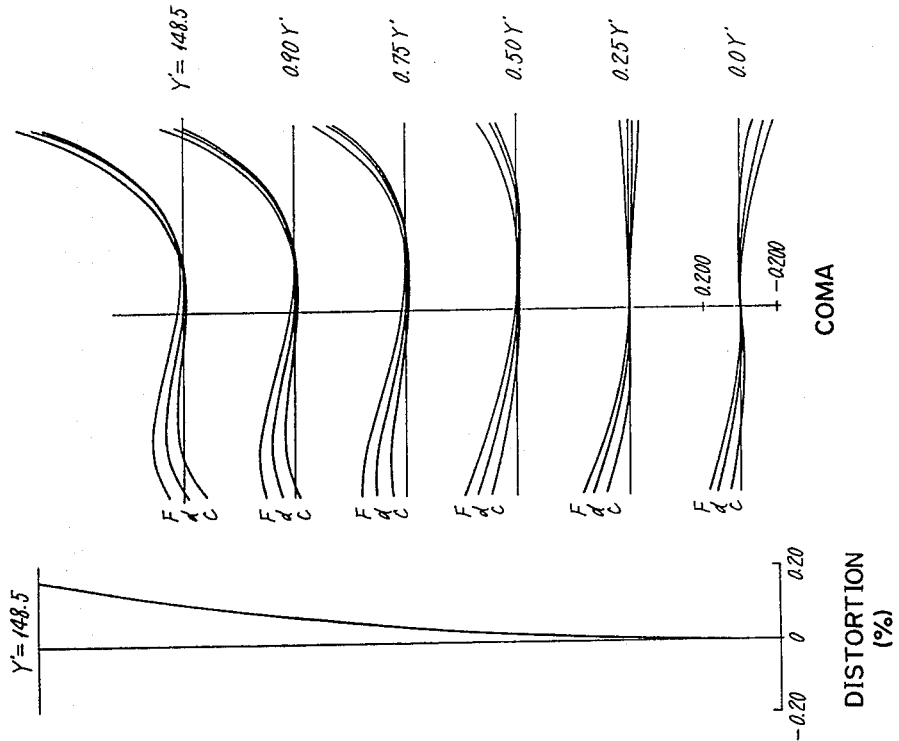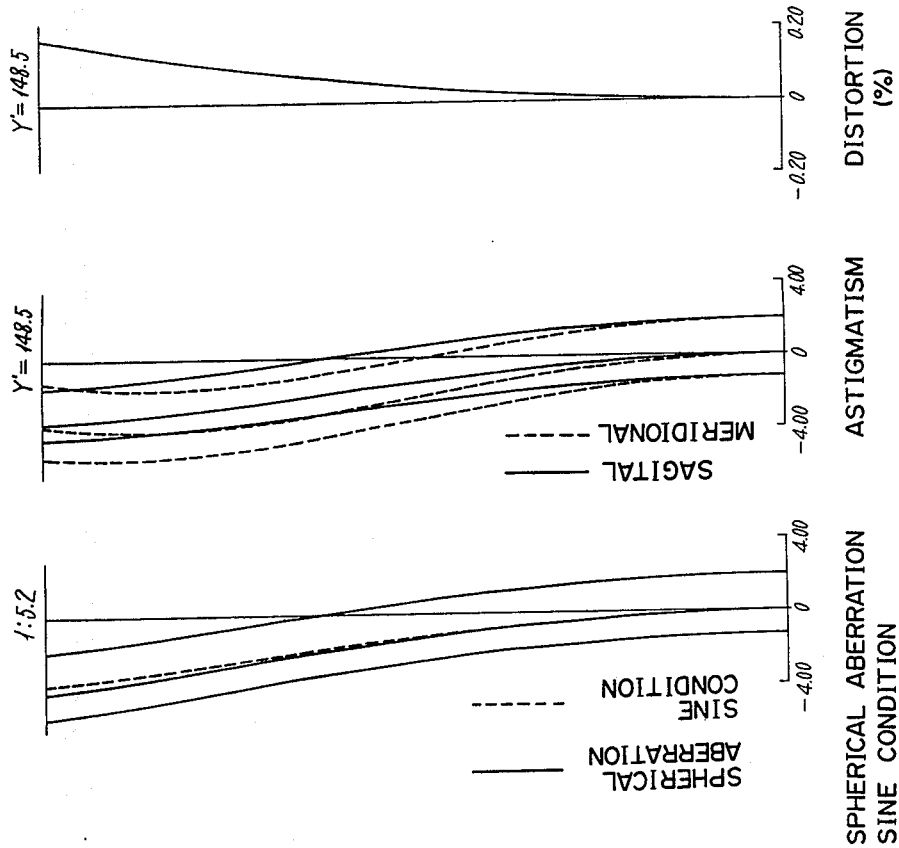

FIG. 20  M = -1.0
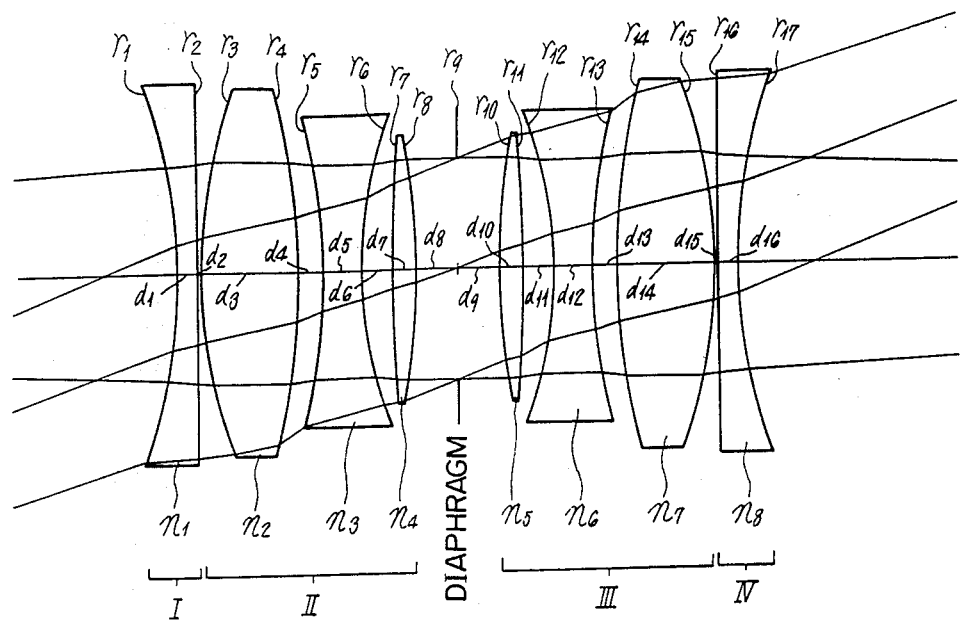
FIG. 23  M = -0.5
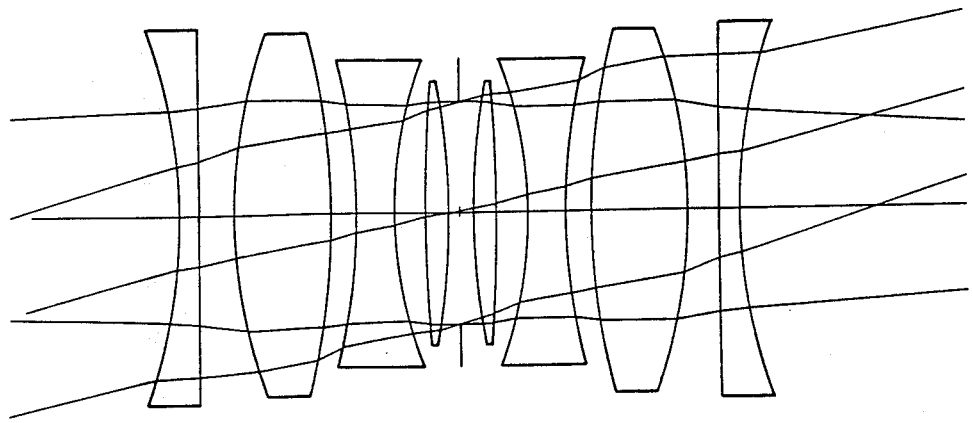

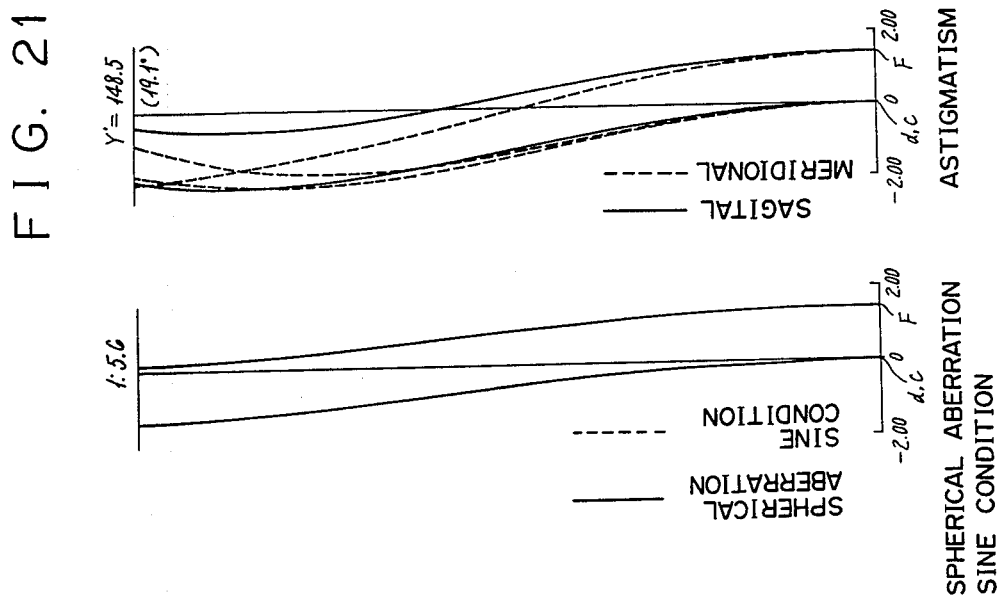

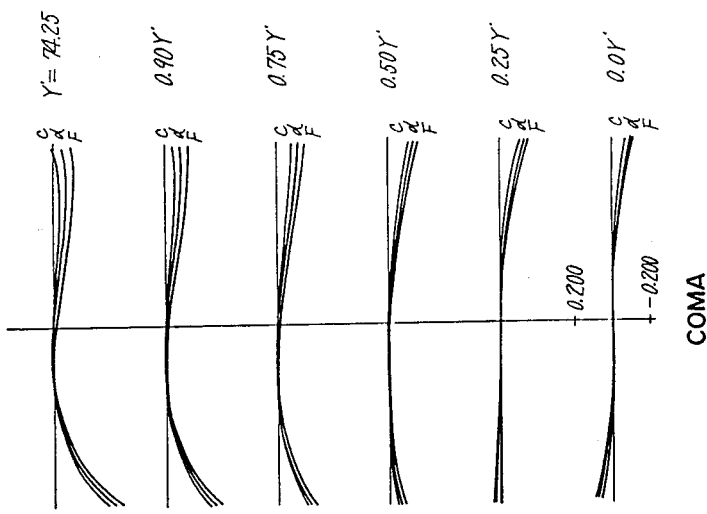
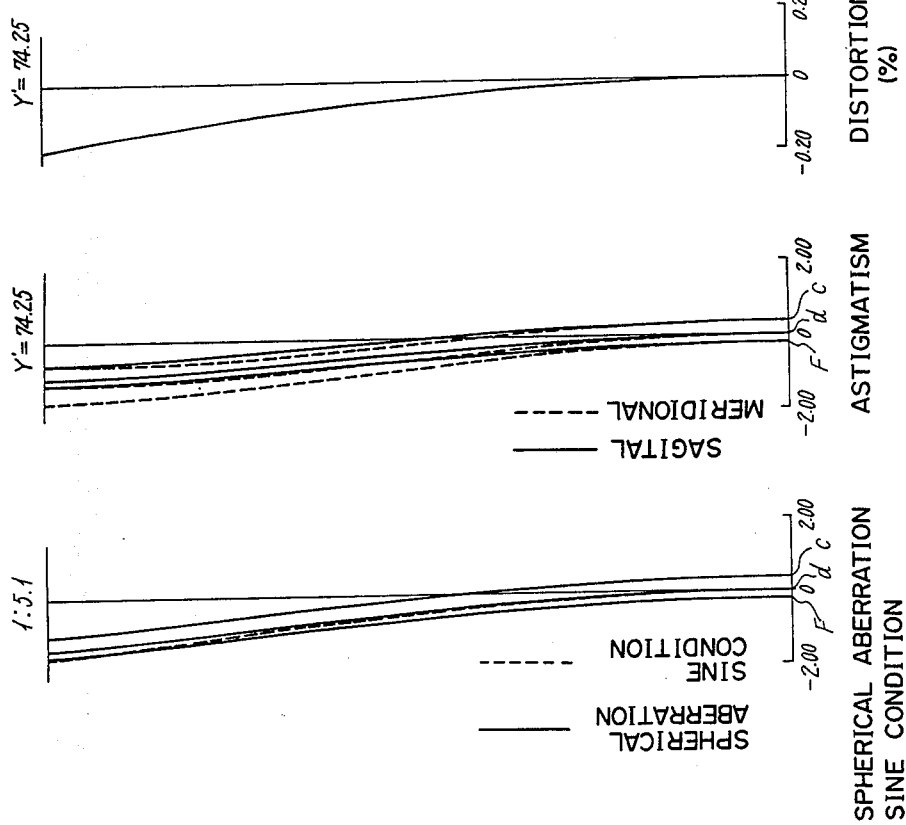

FIG. 26    M = -2.0
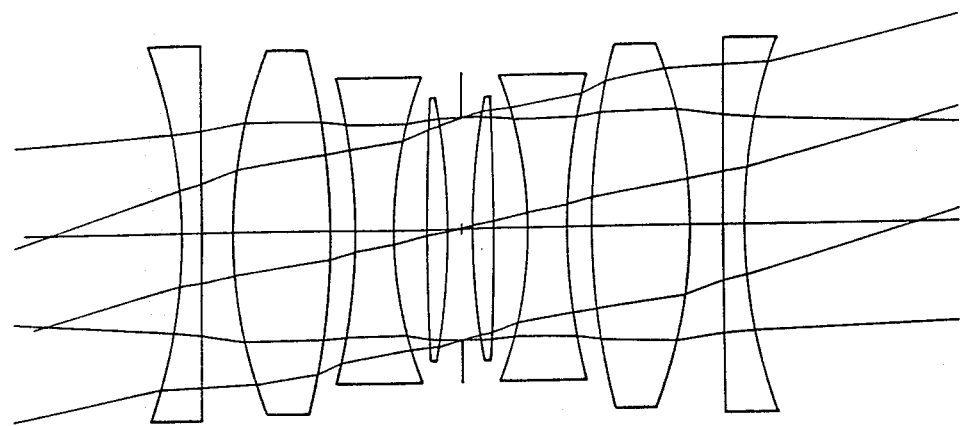
FIG. 29    M = -1.0
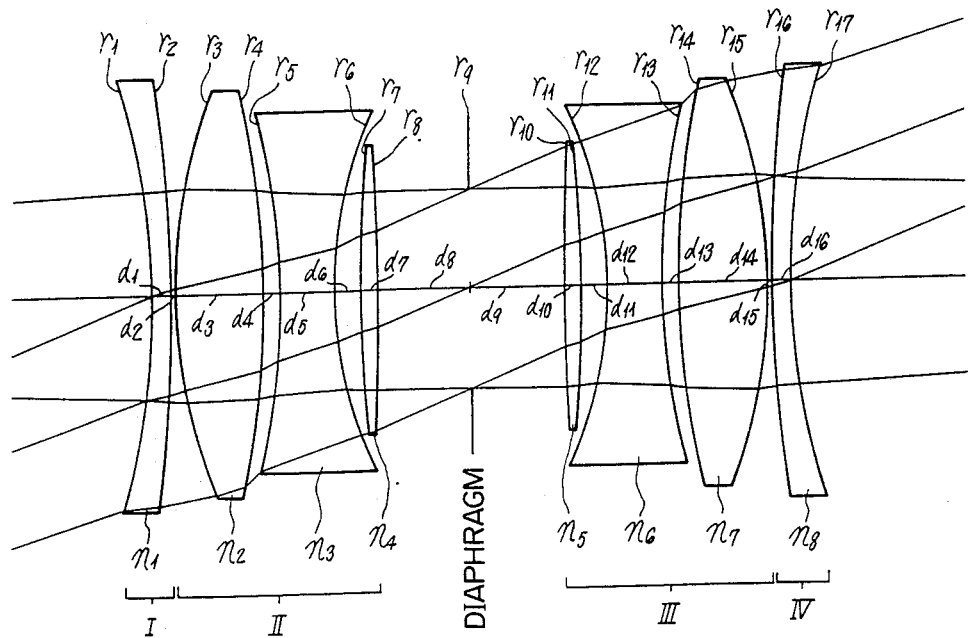

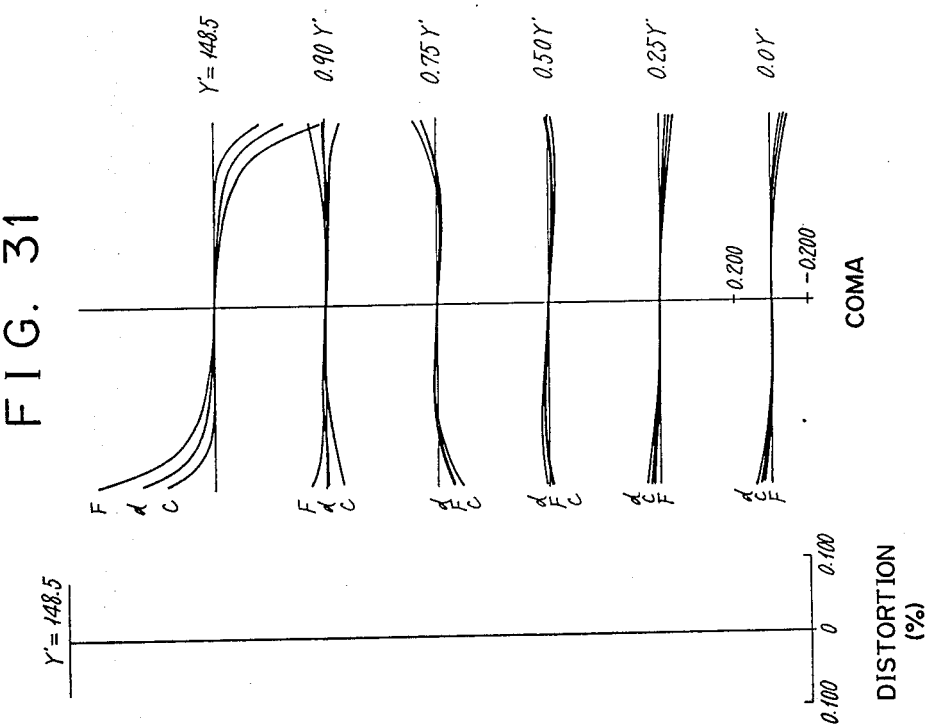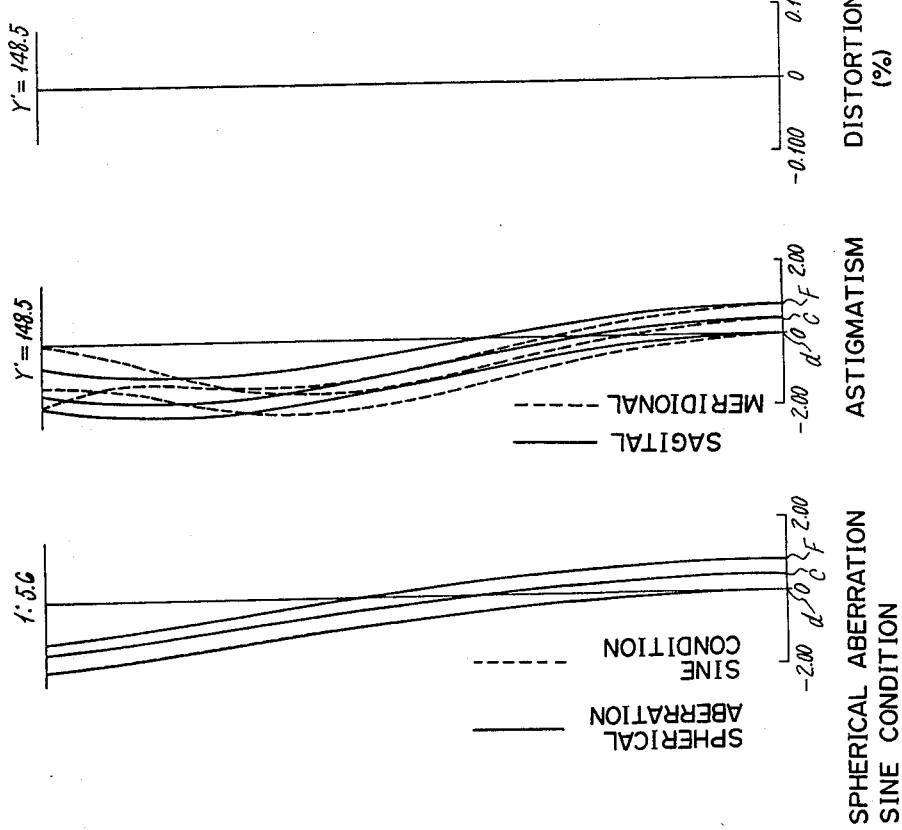

FIG. 32   M=-0.5
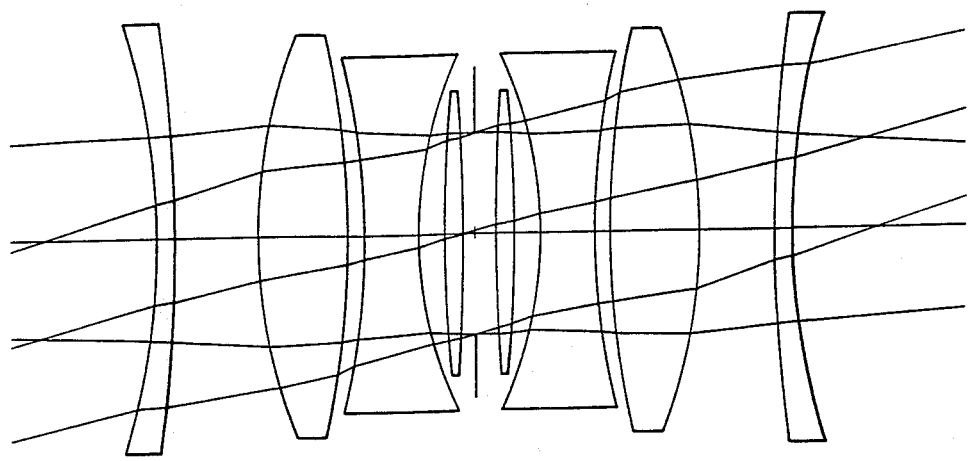
FIG. 35   M=-2.0
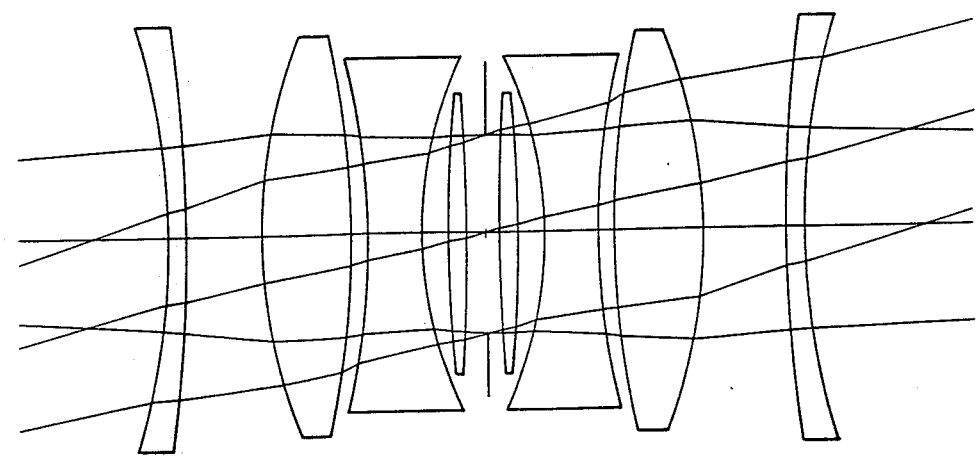

FIG. 38  M=-1.0
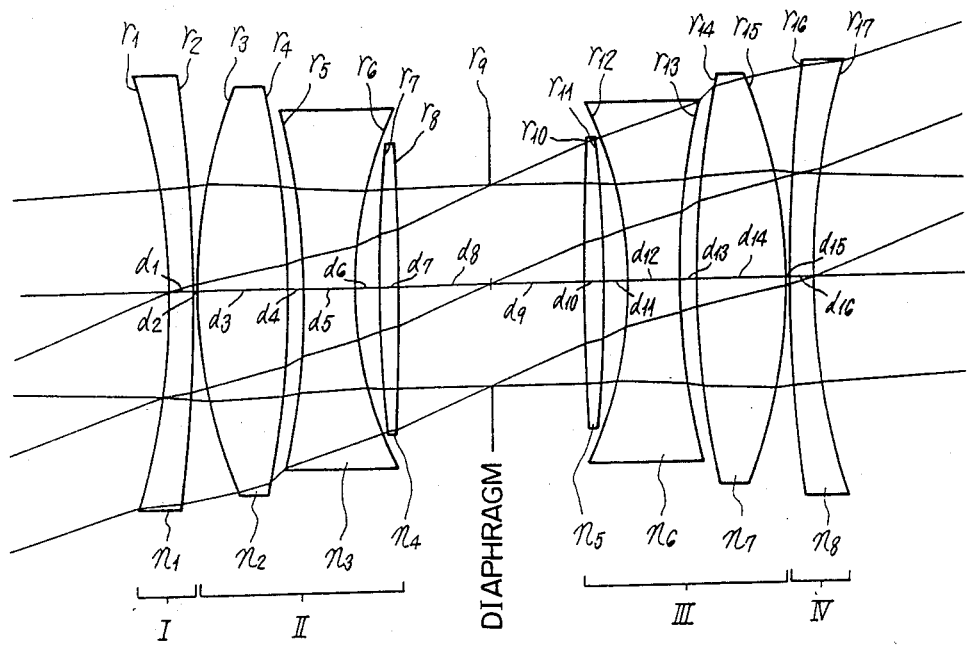
FIG. 41  M=-0.5
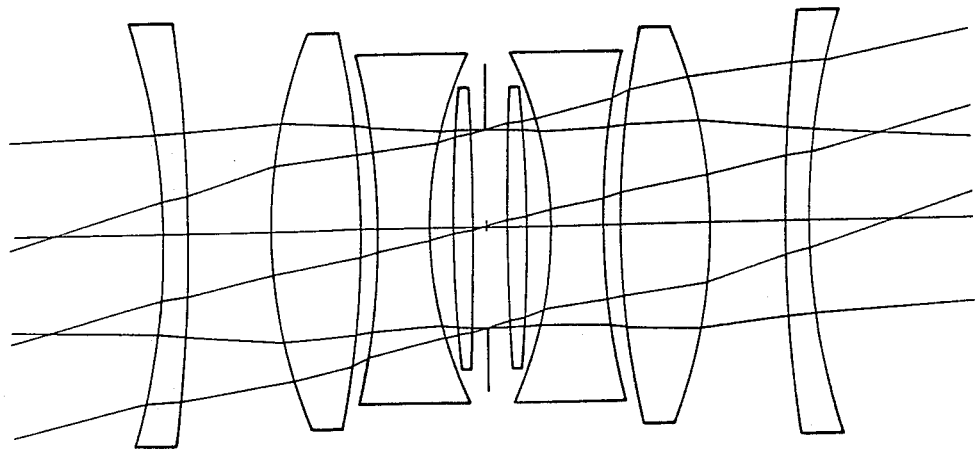

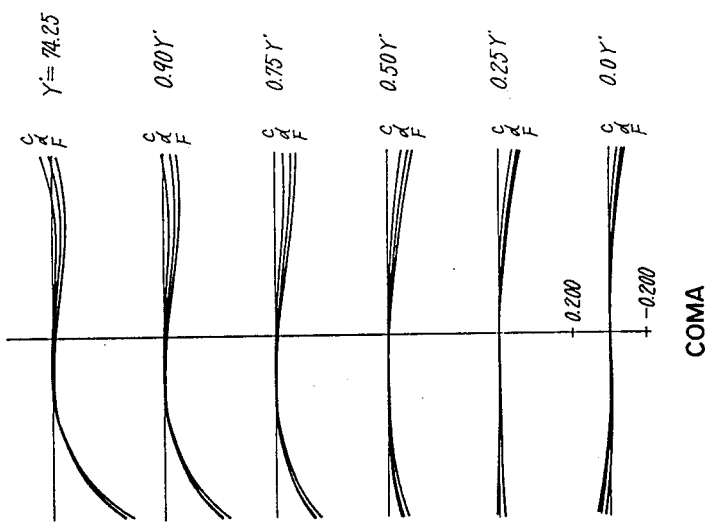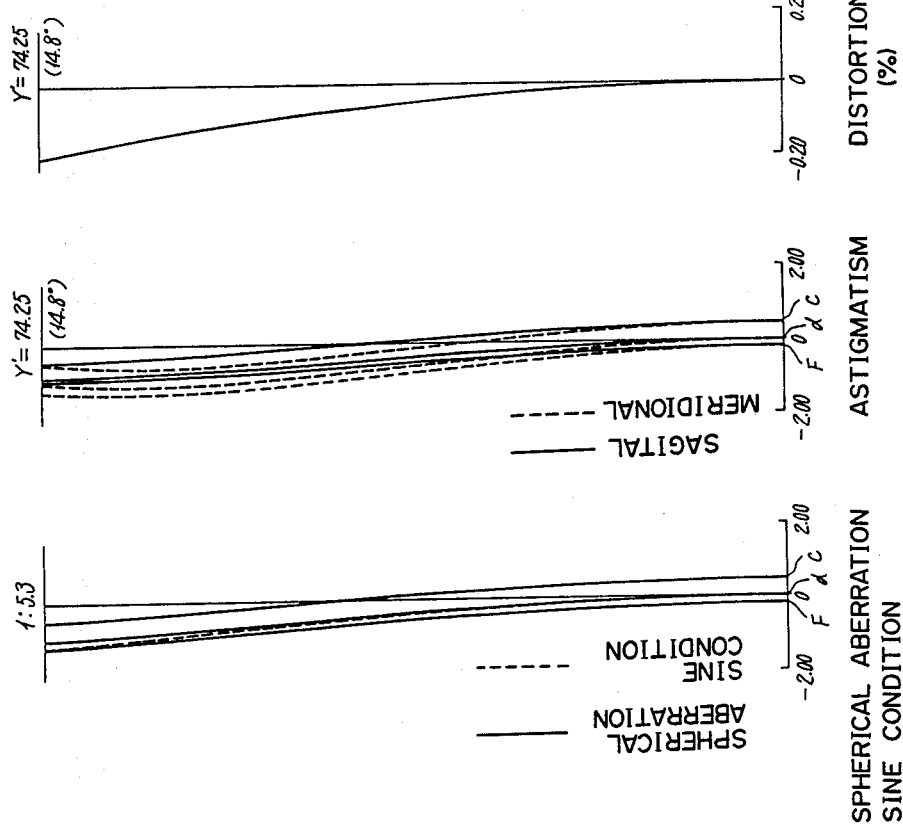

FIG. 44    M = −2.0
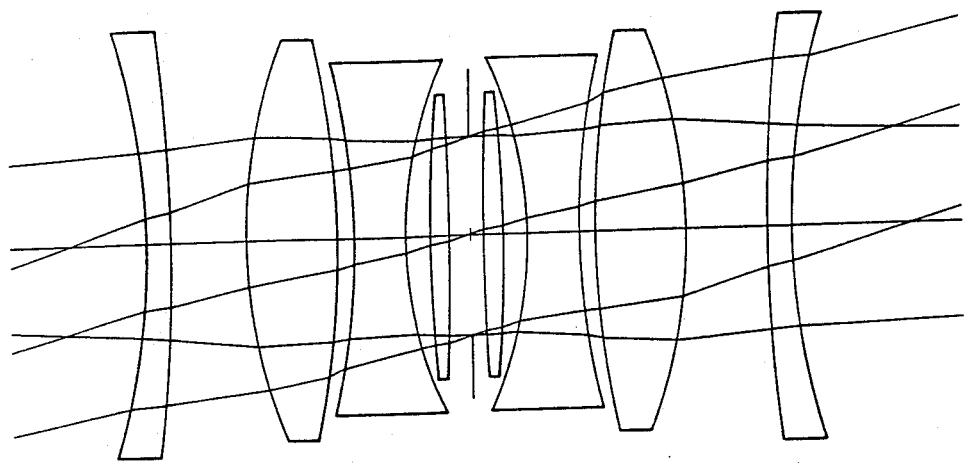
FIG. 47    M = −1.0
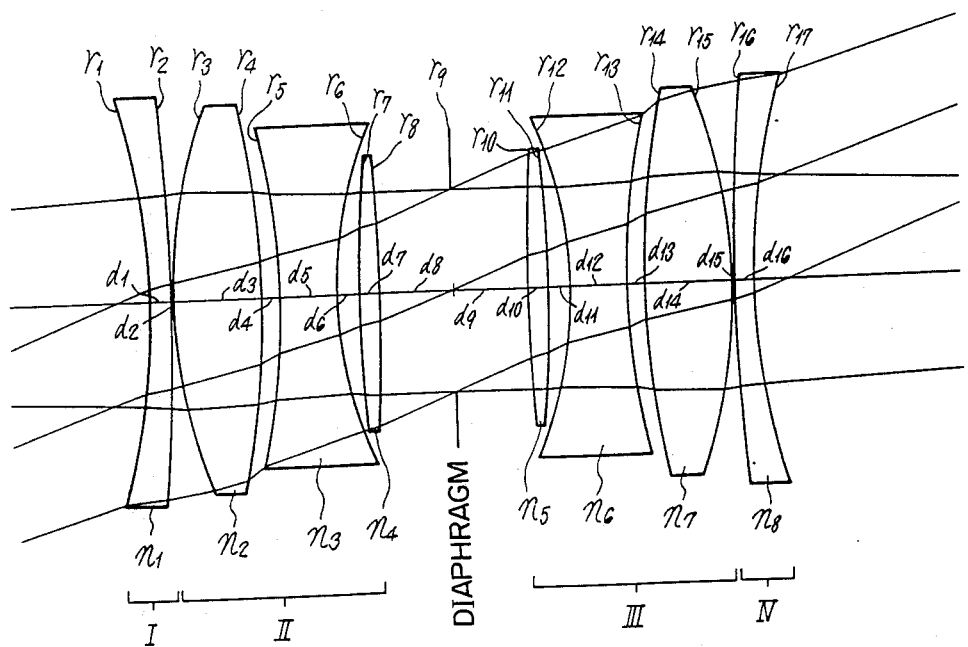

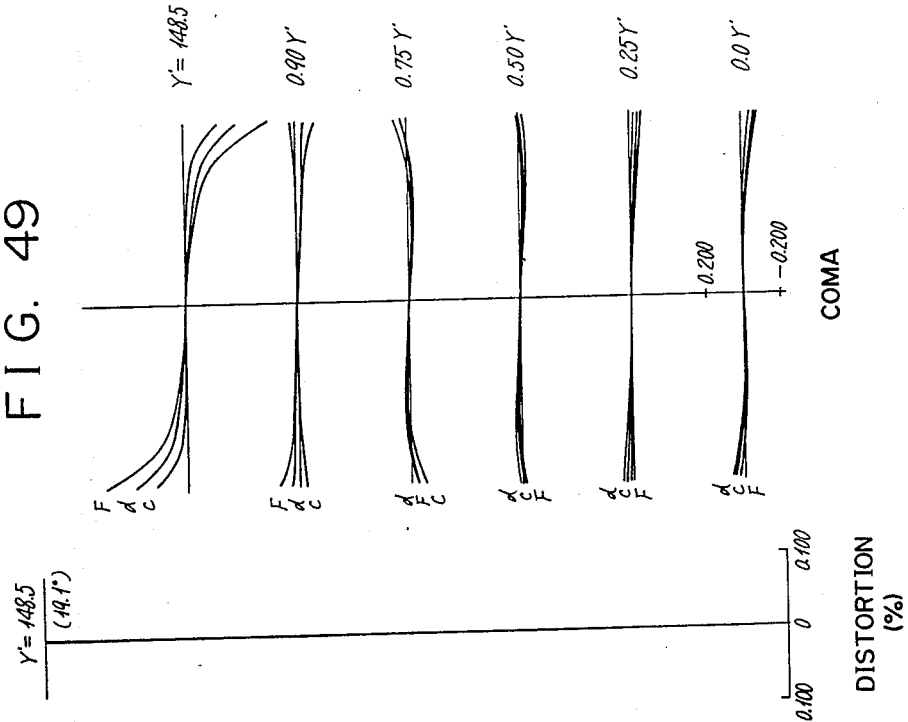
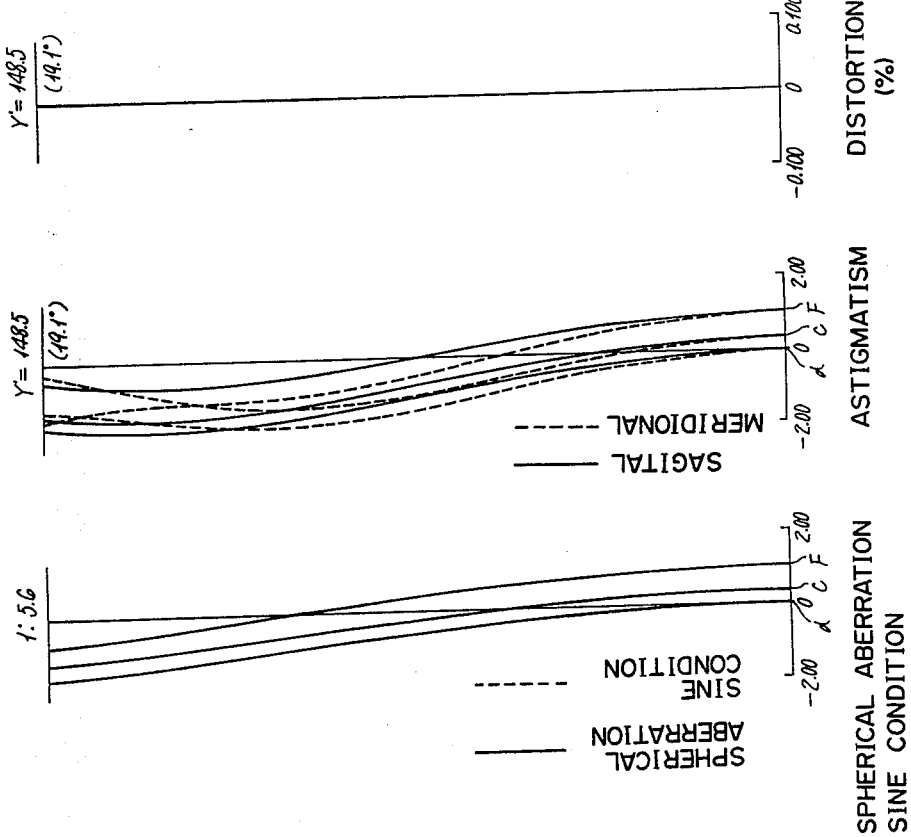

FIG. 50 M=-0.5
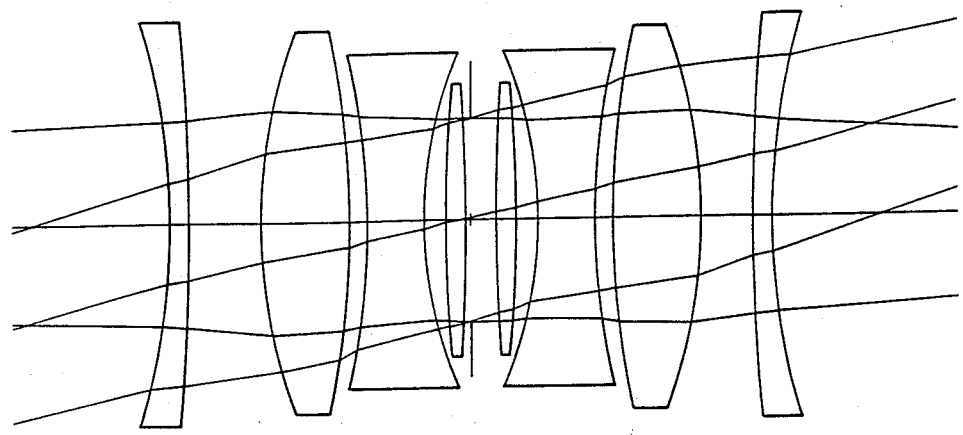
FIG. 53 M=-2.0
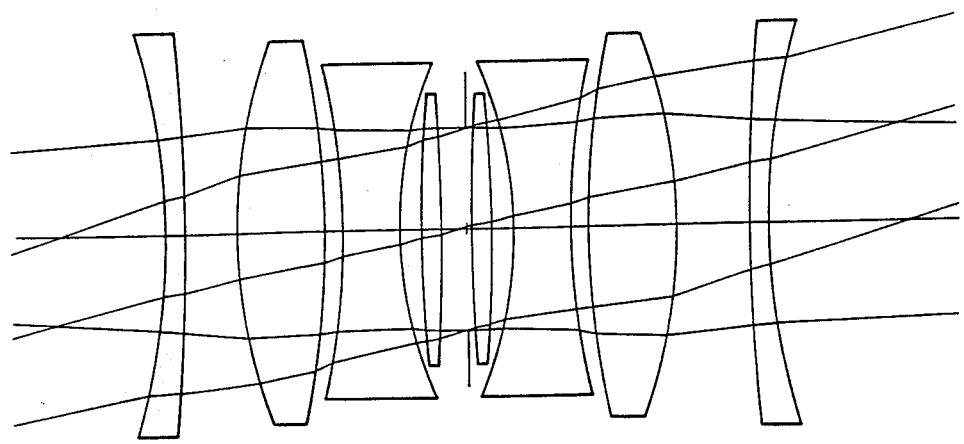

FIG. 56   M=-1.0
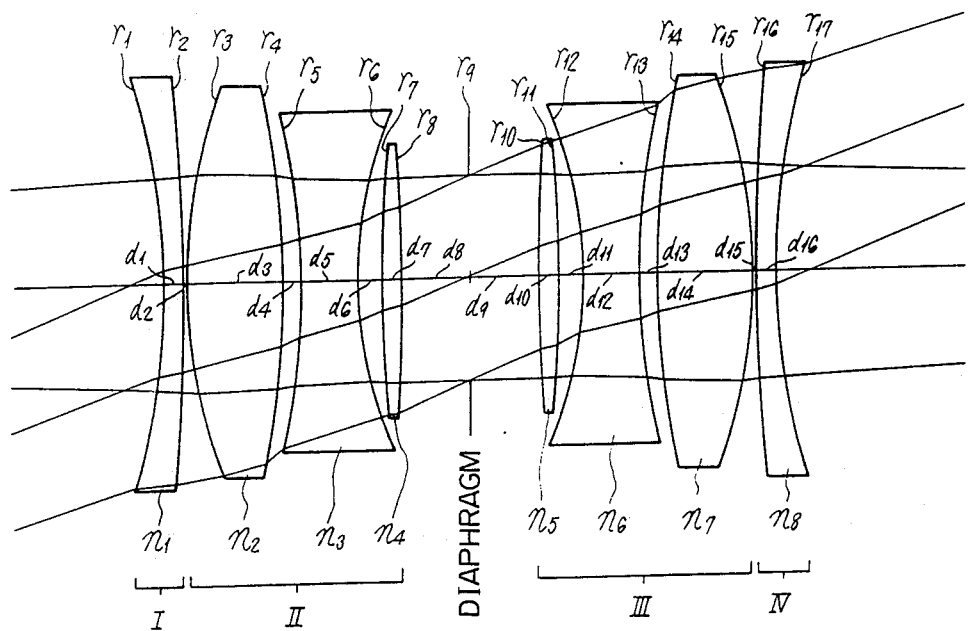
FIG. 59   M=-0.5
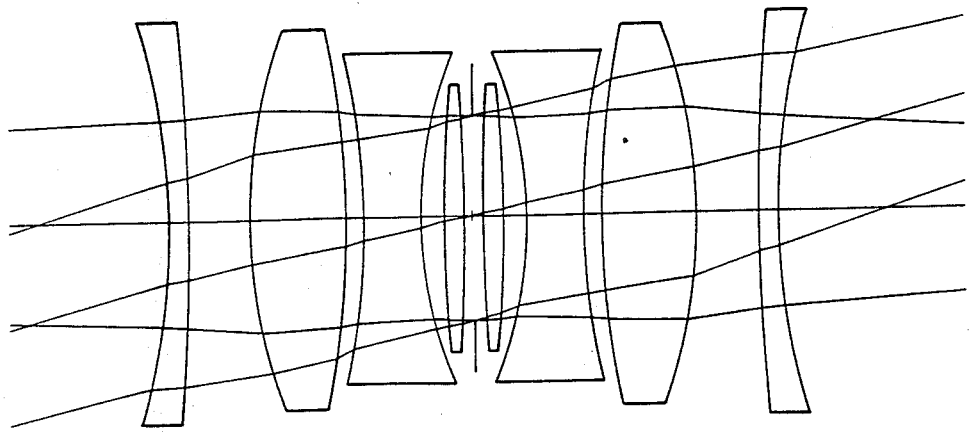

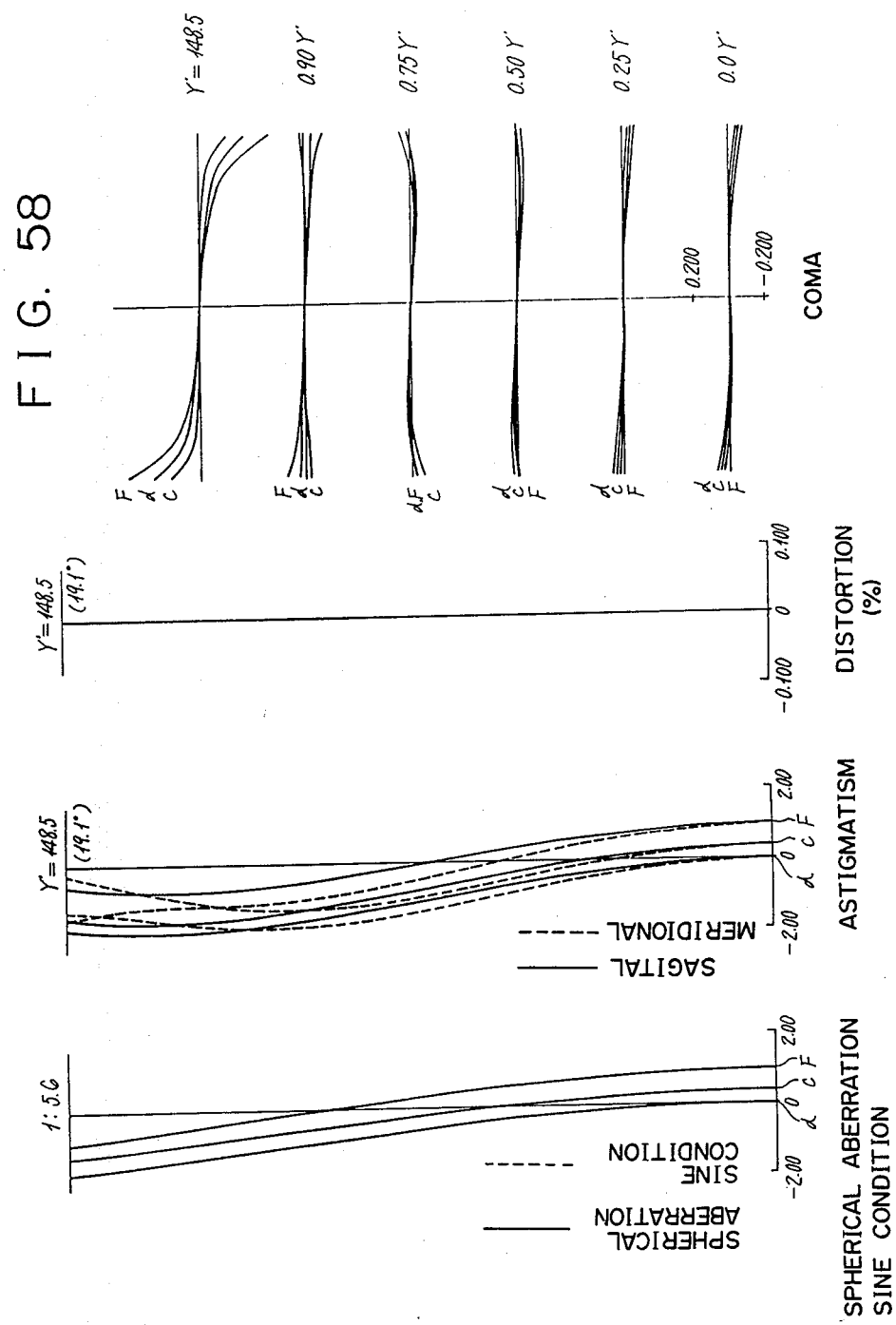

FIG. 62   M=-2.0
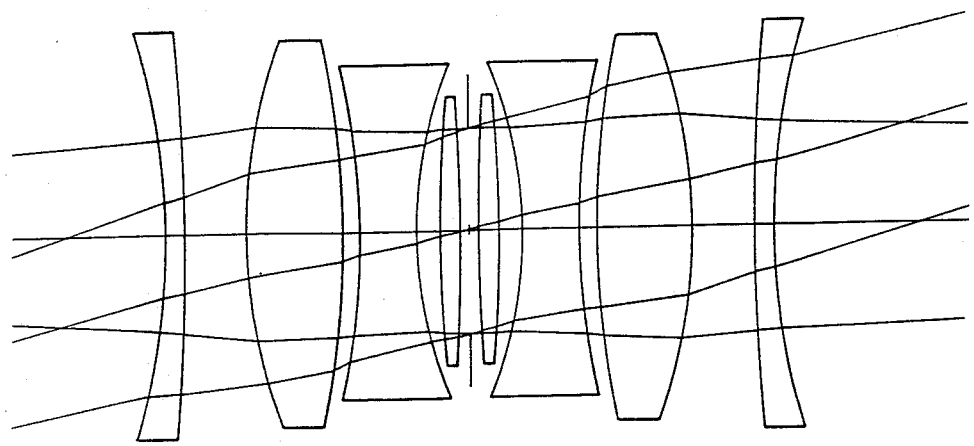
FIG. 65   M=-1.0
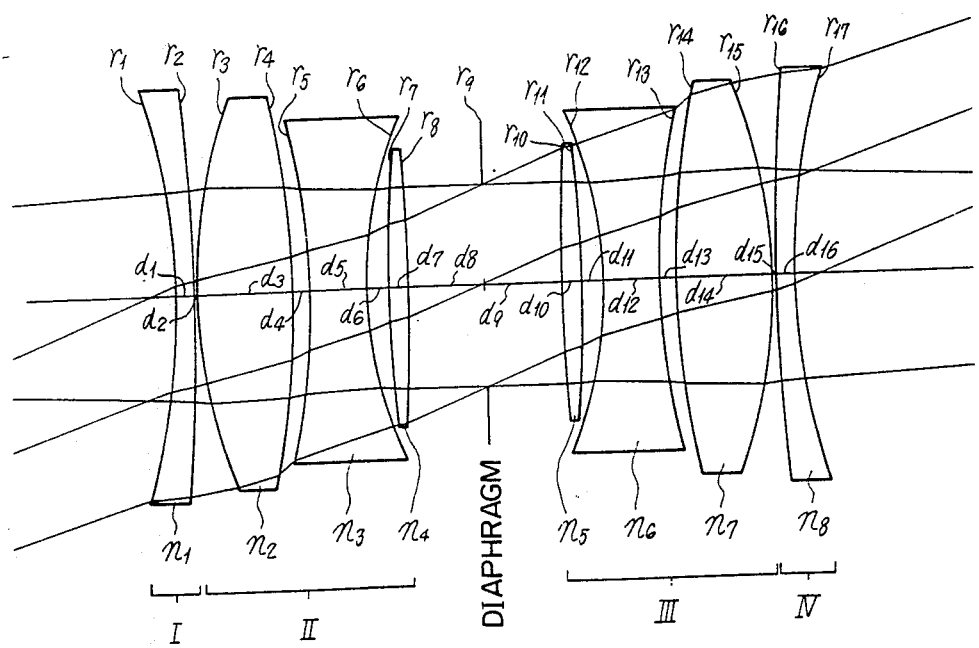

F I G. 68    M = -0.5
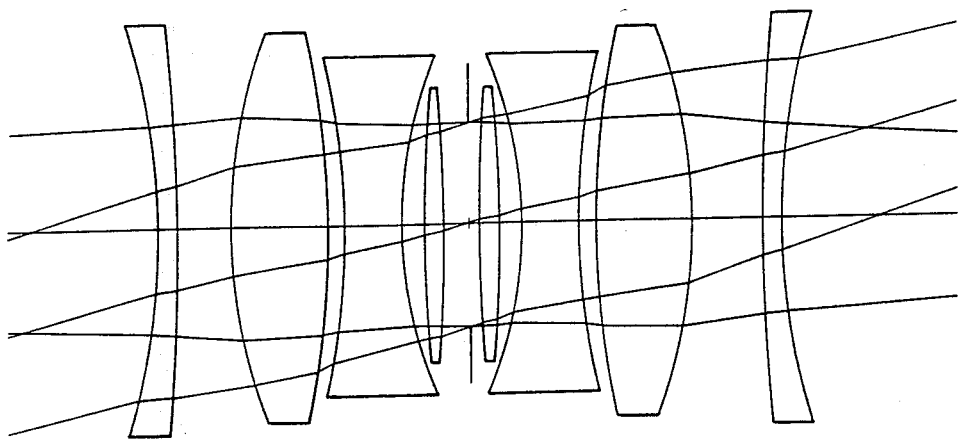
F I G. 71    M = -2.0
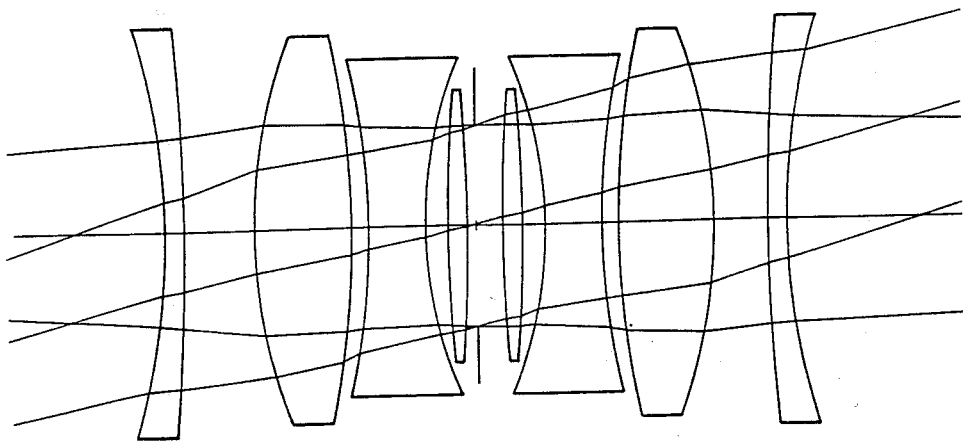

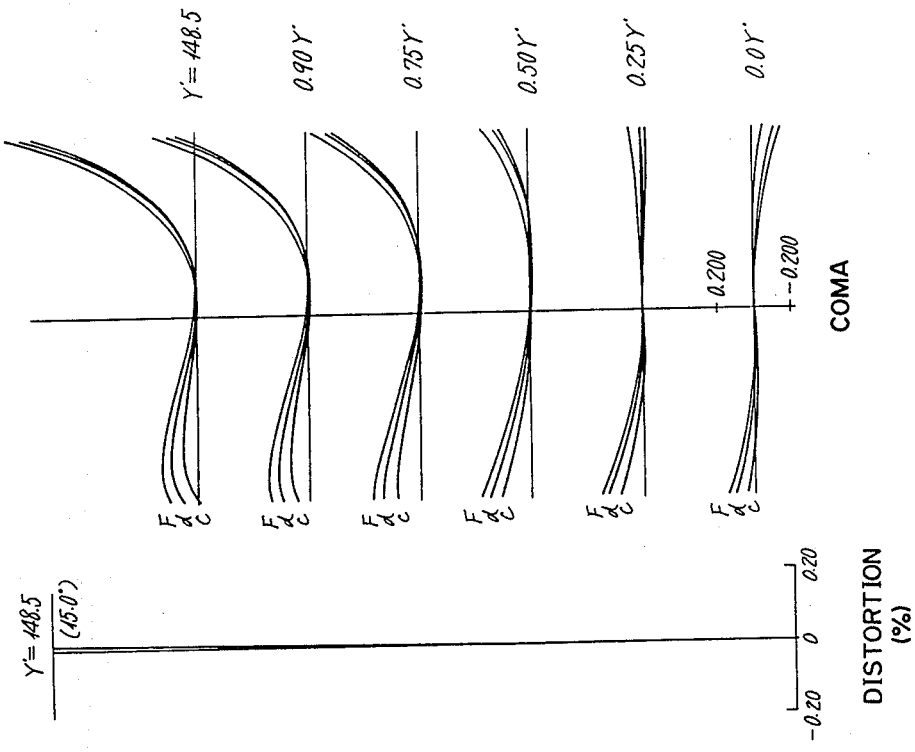
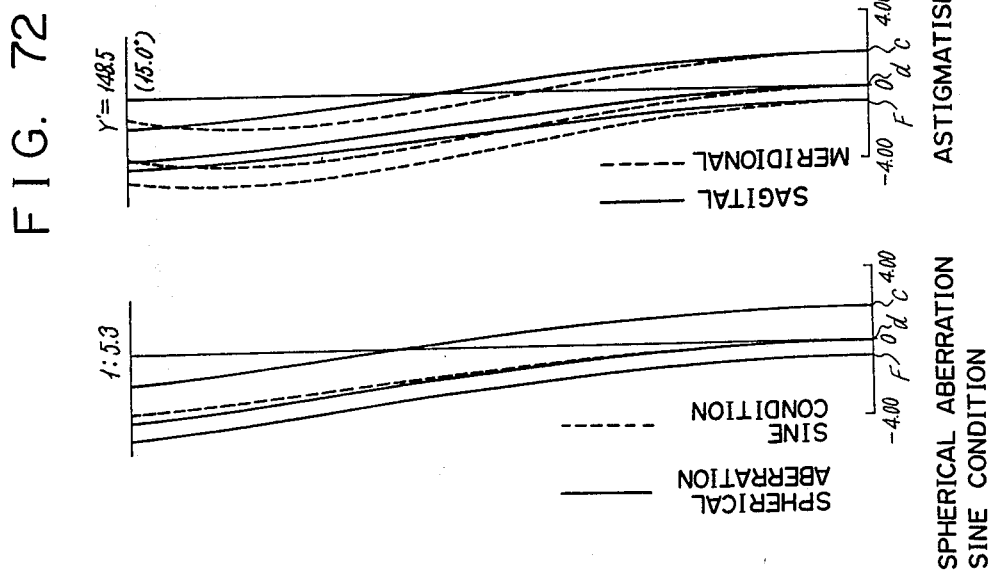

VARIABLE FOCUS LENS FOR IMAGE REPRODUCTION

BACKGROUND OF THE INVENTION

The present invention relates to a variable focus lens for use in image reproduction, and more particularly to a variable focus lens for use in copying images, platemaking, or the like, the lens being capable of continuously varying the magnification while keeping a finite object-to-image distance constant.

Copying machines and printers mostly use an equal-size magnification ratio (i.e., no size enlargement or reduction) for copying images and platemaking. However, more and more copying machines and printers are required to have a size enlarging and reducing function. To meet such a requirement, there is a demand for a variable focus lens capable of continuously varying the magnification while keeping a finite object-to-image distance constant.

Variable focus lenses which can vary the magnification without varying the entire length of the lenses are compact and suitable for smaller F values. The lenses of this type vary the magnification by moving internal lens elements thereof. The lenses of this class are disclosed in Japanese Laid-Open Patent Publications Nos. 48-49453, 53-60655, 57-67909, 59-61814, 60-121414, 61-151604, 61-198205, and 62-123421, for example.

The conventional lenses have however proven unsatisfactory in that their magnification range is small, they have large F numbers, and cannot have an aperture efficiency of 100%.

SUMMARY OF THE INVENTION

In view of the aforesaid drawbacks of the conventional variable focus lenses, it is an object of the present invention to provide a variable focus lens for image reproduction which has an F number of 5.6 and a wide magnification ratio range extending from 0.5 to 2.0, is bright, has an aperture efficiency of nearly 100% at any magnification ratio, and does not move a focused plane when the magnification ratio is varied.

According to the present invention, a variable focus lens has first through fourth lens groups arranged successively from an object to an image, with a diaphragm disposed between the second and third lens groups. The first lens group comprises a concave meniscus lens with its concave surface facing the object. The second lens group comprises a double convex lens with the larger absolute value of the radius of curvature of its surface facing the image, a double concave lens with the larger absolute value of the radius of curvature of its surface facing the object, and a double convex lens, the lenses being arranged successively in the order named from the object. The third lens group is of the same construction as the second lens group except that the lenses of the third lens group are arranged and faced in the opposite direction to the second lens group, the second and third lens groups being positioned symmetrically with respect to the diaphragm. The fourth lens group comprises an lens identical to the lens of the first lens group and faced in the opposite direction to the first lens group, the first and fourth lens groups being positioned symmetrically with respect to the diaphragm. The first and fourth lens groups and the diaphragm are fixed, whereas the second and third lens groups are movable, the first through fourth lens groups being positioned symmetrically with respect to the diaphragm at an equal-size magnification ratio. The second and third lens groups are movable symmetrically or asymmetrically for varying the magnification ratio to move the lenses along an optical axis thereby to keep an object-to-image distance constant.

The variable focus lens meets the following conditions:

$$0.56f < f_2 = f_3 < 0.91f \tag{I}$$

$$44.8 < \nu_1 = \nu_8 < 62.0 \tag{II}$$

$$0.28f < r_6 < 0.34f \tag{III}$$

$$0.0155f < d_6 < 0.0261f \tag{IV}$$

$$-1.40 < b/a < -0.67 \tag{V}$$

where f represents the combined focal length of the variable focus lens, $f_2$, $f_3$, the focal lengths of the second and third lens groups, respectively, $\nu_j$ ($j=1\sim8$) the Abbe number of the jth lens from the object, $r_i$ ($i=1\sim17$) the radius of curvature of the ith surface from the object (with the diaphragm surface counted), $d_i$ ($i=1\sim16$) the ith surface-to-surface distance from the object, and a, b the distances, respectively, that the second and third lens groups move from the equal-size magnification ratio position to the minimum magnification ratio position (the movement toward the image is positive and the movement toward the object is negative).

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIGS. 2 through 10 are diagrams showing the arrangement of a variable focus lens according to EXAMPLE 1 and the curves of aberrations and coma of the lens;

FIGS. 11 through 19 are diagrams showing the arrangement of a variable focus lens according to EXAMPLE 2 and the curves of aberrations and coma of the lens;

FIGS. 20 through 28 are diagrams showing the arrangement of a variable focus lens according to EXAMPLE 3 and the curves of aberrations and coma of the lens;

FIGS. 29 through 37 are diagrams showing the arrangement of a variable focus lens according to EXAMPLE 4 and the curves of aberrations and coma of the lens;

FIGS. 38 through 46 are diagrams showing the arrangement of a variable focus lens according to EXAMPLE 5 and the curves of aberrations and coma of the lens;

FIGS. 47 through 55 are diagrams showing the arrangement of a variable focus lens according to EXAMPLE 6 and the curves of aberrations and coma of the lens;

FIGS. 56 through 64 are diagrams showing the arrangement of a variable focus lens according to EXAM- PLE 7 and the curves of aberrations and coma of the lens; and FIGS. 65 through 73 are diagrams showing the arrangement of a variable focus lens according to EXAMPLE 8 and the curves of aberrations and coma of the lens.

DETAILED DESCRIPTION

A variable focus lens in accordance with the present invention has first through fourth lens groups arranged successively from an object to an image, with a diaphragm disposed between the second and third lens groups.

The variable focus lens will be described below with reference to FIG. 2 which shows EXAMPLE 1 of the present invention. The first lens group I comprises a concave meniscus lens with its concave surface facing the object (on the lefthand side). The second lens group II comprises a double convex lens with the larger absolute value of the radius of curvature of its surface facing the image, a double concave lens with the larger absolute value of the radius of curvature of its surface facing the object, and a double convex lens, these lenses being arranged successively in the order named from the object.

The third lens group III is of the same construction as the second lens group II except that the lenses are arranged and faced in the opposite direction to the second lens group II. The second and third lens groups II, III are positioned symmetrically with respect to the diaphragm disposed therebetween. The fourth lens groups IV comprises a lens identical to the lens of the first lens group I and faced in the opposite direction to the first lens group I. The first and fourth lens groups I, IV are positioned symmetrically with respect to the diaphragm disposed therebetween.

Figure 1:
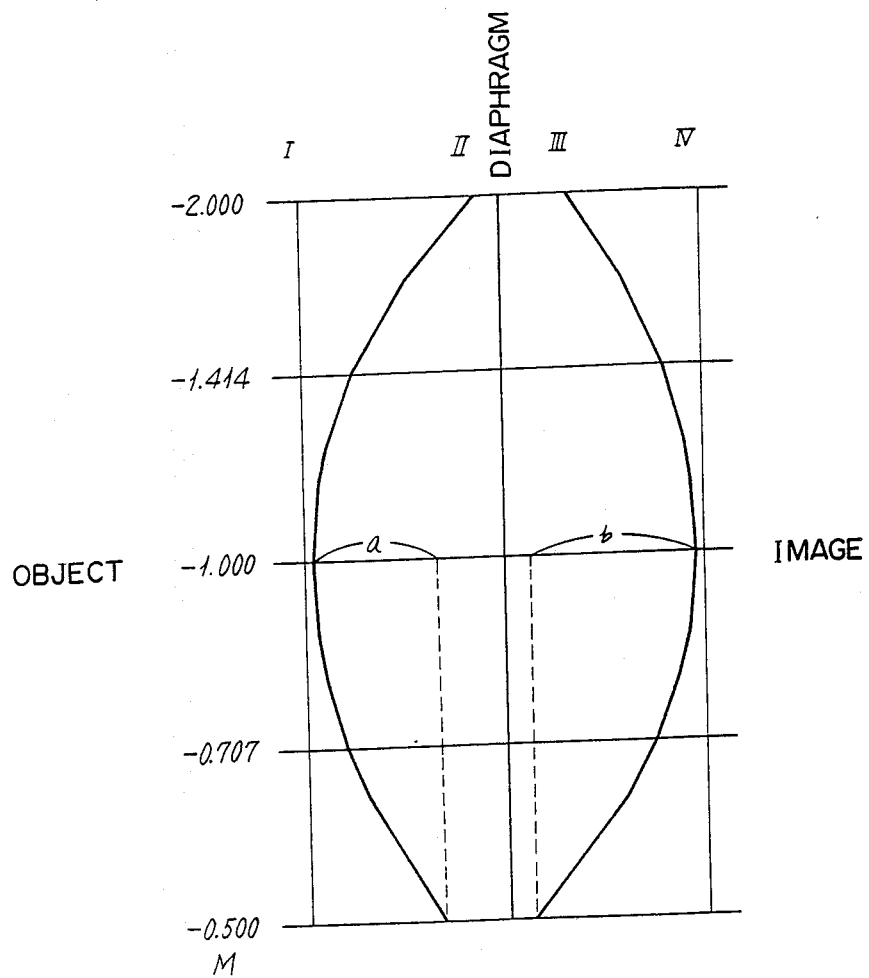
FIG. 1 is a schematic diagram illustrating the manner in which movable lens groups move when the magnification ratio is varied.

The first and fourth lens groups and the diaphragm are fixed, whereas the second and third lens groups are movable. For reproducing an image at an equal-size magnification ratio (i.e., no size enlargement or reduction), the first through fourth lens groups are positioned symmetrically with respect to the diaphragm as shown in FIG. 1. For varying the magnification ratio, the second and third lens groups are asymmetrically or symmetrically moved to move the entire lens system along the optical axis for keeping an object-to-image distance constant, as shown in FIG. 1.

It is assumed that the combined focal length of the entire lens system at the equal-size magnification ratio is represented by f, the focal lengths of the second and third lens groups by $f_2$, $f_3$, respectively, the Abbe number of the jth lens from the object by $\nu_j$ ($j=1\sim 8$), the radius of curvature of the ith surface from the object (with the diaphragm surface counted) by $r_i$ ($i=1\sim 17$), the ith surface-to-surface distance by $d_i$ ($i=1\sim 16$), and the distances that the second and third lens groups move from the equal-size magnification ratio position to the minimum magnification ratio position by a, b, respectively, as shown in FIG. 1 (the movement toward the image is positive and the movement toward the object is negative). The variable focus lens of the present invention is constructed to meet the following conditions:

$$0.56f < f_2 = f_3 < 0.91f \quad \text{(I)}$$

$$44.8 < \nu_1 = \nu_8 < 62.0 \quad \text{(II)}$$

$$0.28f < r_6 < 0.34f \quad \text{(III)}$$

$$0.0155f < d_6 < 0.0261f \quad \text{(IV)}$$

$$-1.40 < b/a < -0.67 \quad \text{(V)}$$

The above conditions will now be described in detail. The condition (I) indicates the range of focal lengths of the second and third lens groups with respect to the combined focal length at the equal-size magnification ratio. The condition (I) is important in distributing the refracting power. If the upper limit of the condition (I) were exceeded, the overall length of the lens would be increased, and the flare of coma on the outermost periphery at the equal-size magnification ratio would be increased, thus lowering the performance of the lens. If the lower limit of the condition (I) were exceeded, then the entire lens system would be reduced in length and rendered compact, but the image plane would become negative upon image enlargement, and the magnification ratio could not be in excess of 4. EXAMPLE 1, described later on, has a value near the upper limit of the condition (I), EXAMPLE 3, also described later on, has a value near the lower limit of the condition (I), and EXAMPLE 2, also described later on, has a value substantially in the middle of the range of the condition (I). The validity of the range indicated by the condition (I) is apparent upon study of EXAMPLES 1, 2, and 3.

The condition (II) represents the range of Abbe numbers of the first and fourth lens groups.

Even by correcting on-axis chromatic aberration to reduce the amount of aberration at an equal-size magnification ratio, chromatic aberration is produced again when the internal lens groups are moved to vary the magnification ratio, the chromatic aberration being larger upon image size enlargement. This problem can effectively be solved by using glass having a large Abbe number. If the upper limit of the condition (II) were exceeded, the Abbe number of the convex lenses would have to be increased. Even if such glass were used or not, the refractive indexes would be small and the Petzval sum would be increased, thus lowering the lens performance. If the lower limit were exceeded, the freedom of correcting chromatic aberration at an equal-size magnification ratio would be available, but when the magnification ratio is increased, chromatic aberration would vary to a larger extent. When the Abbe number is reduced, the refractive indexes of the concave lenses would be increased and the Petzval sum would be increased, so that the lens performance would be lowered. EXAMPLE 5, described later on, has a value near the upper limit of the condition (II), and EXAMPLE 4, also described later on, has a value near the lower limit of the condition (II). The validity of the range of the condition (II) is apparent through the study of EXAMPLES 4 and 5.

The condition (III) is related to the condition (IV) and serves to reduce the F number and increase the aperture efficiency. According to the condition (III), coma is reduced if the radius of curvature $r_6$ is larger. If the upper limit of the condition (III) were exceeded, the Petzval sum would be increased and the image plane would be negative. If the lower limit were exceeded, the image plane would be positive, but as the image height is increased, coma would be increased, and the lens performance would be lowered. EXAMPLE 3 has a value near the upper limit of the condition (III), and EXAMPLE 1 has a value near the lower limit of the condition (III). The validity of the range indicated by the condition (III) is apparent upon study of EXAMPLES 1 and 3.

According to the condition, the aperture efficiency is large if the distance $d_6$ is increased. However, if the upper limit were exceeded, the angle of view would be reduced, and the astigmatic difference would be large where the image height is large. If the lower limit were exceeded, no desired aperture efficiency would be obtained. EXAMPLE 3 has a value near the upper limit of the condition (IV), and EXAMPLE 6, described later on, has a value near the lower limit of the condition (IV). The validity of the range indicated by the condition (IV) is apparent through the study of EXAMPLES 3 and 6.

The condition (V) gives a range of ratios between directions and distances of movement of the movable lens groups. For varying the magnification ratio from an equal-size magnification ratio position, the second and third lens groups are moved in opposite directions. If the upper limit of the condition (V) were exceeded, distortion would be reduced to near zero at each magnification ratio, but the image plane would be negative and coma would be increased upon image size enlargement. If the lower limit were exceeded, distortion would be ±0.3% or greater, and the lens system would no longer be suitable for use in a copying machine. EXAMPLE 8, described later on, has a value near the upper limit of the condition (V), and EXAMPLE 6 has a value near the lower limit of the condition (V). The validity of the range indicated by the condition (V) is apparent through the study of EXAMPLES 6 and 8. The movable lens groups are moved symmetrically in EXAMPLE 7, and the movable lens groups are moved asymmetrically in other EXAMPLES. When the above conditions (I) through (V) are met, the movable lens groups can be moved either symmetrically or asymmetrically.

Eight specific EXAMPLES will now be described below.

In each of EXAMPLES, M indicates the magnification ratio, F the F number, f.l the focal length of the entire lens system, $\omega$ the half angle of view, Y the height of the object, Y' the height of the image, $f_2$, $f_3$ the focal lengths of the second and third lens groups, respectively, $r_i$ the radius of curvature of the ith surface from the object (with the diaphragm surface counted), $d_i$ the ith surface-to-surface distance from the object, $n_j$, $\nu_j$ the refractive index and the Abbe number of the jth lens from the object, $S_1$ the distance from the object to the first surface, SL the distance from the final surface to the image point, U the conjugate length, L the overall length of the lens system, P the Petzval sum at an equal-size magnification ratio, and a, b the distances, respectively, that the second and third lens groups move from the equal-size magnification ratio position to the minimum magnification ratio position. FIGS. 2, 11, 20, 29, 38, 47, 56, and 65 show the first through fourth lens groups I, II, III, IV in respective EXAMPLES at an equal-size magnification ratio.

EXAMPLE 1:

| | | | |
|---|---|---|---|
| M | −2.0 | −1.0 | −0.5 |
| F | 5.2 | 5.6 | 5.3 |
| f.l | 188.22 | 215.01 | 188.22 |
| $\omega$ | 14.6° | 19.1° | 14.8° |
| Y | −74.25 | −148.50 | −148.50 |
| Y' | 148.50 | 148.50 | 74.25 |
| $d_2$ | 12.758 | 0.499 | 14.120 |
| $d_8$ | 3.476 | 15.735 | 2.114 |
| $d_9$ | 2.114 | 15.735 | 3.476 |
| $d_{15}$ | 14.120 | 0.499 | 12.758 |
| $S_1$ | −240.587 | −380.645 | −520.701 |
| SL | 520.701 | 380.645 | 240.587 |
| U | 868.892 | 868.895 | 868.892 |

$f_2 = f_3 = 187.320 = 0.871f$, $r_6/f = 0.297$, $d_6/f = 0.0203$
$a = 13.621$, $b = -12.259$, $b/a = -0.900$, $L = 107.604$,
$P = 0.080$

| i | $r_i$ | $d_i$ | J | $n_j$ | $\nu_j$ |
|---|---|---|---|---|---|
| 1 | −108.513 | 4.687 | 1 | 1.51742 | 52.4 |
| 2 | −237.916 | Variable | | | |
| 3 | 81.946 | 14.667 | 2 | 1.74400 | 44.8 |
| 4 | −145.549 | 2.875 | | | |
| 5 | −119.396 | 6.750 | 3 | 1.59270 | 35.3 |
| 6 | 63.947 | 4.365 | | | |
| 7 | 240.725 | 4.224 | 4 | 1.67003 | 47.3 |
| 8 | −390.485 | Variable | | | |
| 9 | ∞ (Diaphragm) | Variable | | | |
| 10 | 390.485 | 4.224 | 5 | 1.67003 | 47.3 |
| 11 | −240.725 | 4.365 | | | |
| 12 | −63.947 | 6.750 | 6 | 1.59270 | 35.3 |
| 13 | 119.396 | 2.875 | | | |
| 14 | 145.549 | 14.667 | 7 | 1.74400 | 44.8 |
| 15 | −81.946 | Variable | | | |
| 16 | 237.916 | 4.687 | 8 | 1.51742 | 52.4 |
| 17 | 108.513 | | | | |

Figure 3:
Figure 4:
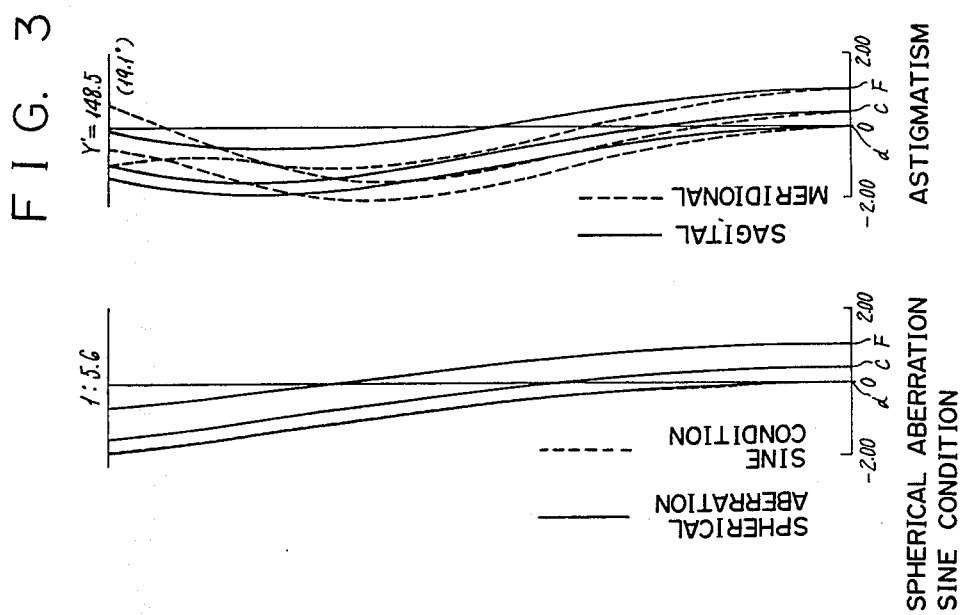
Figure 7:
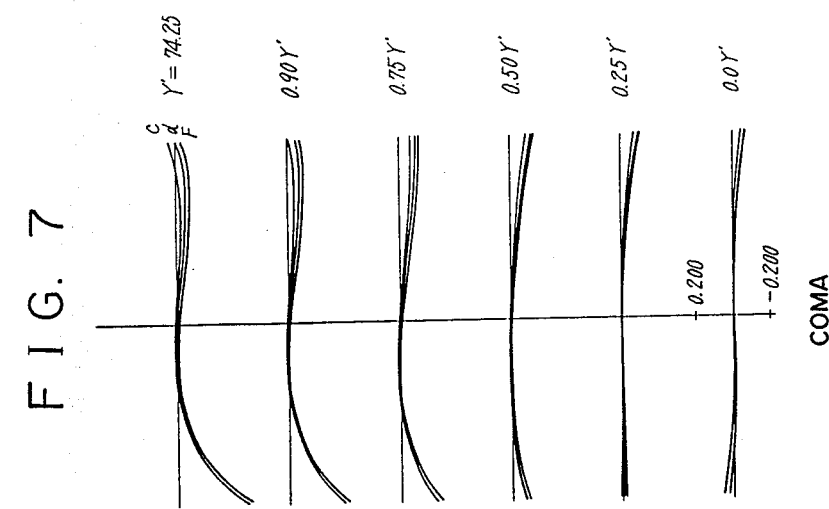
Figure 6:
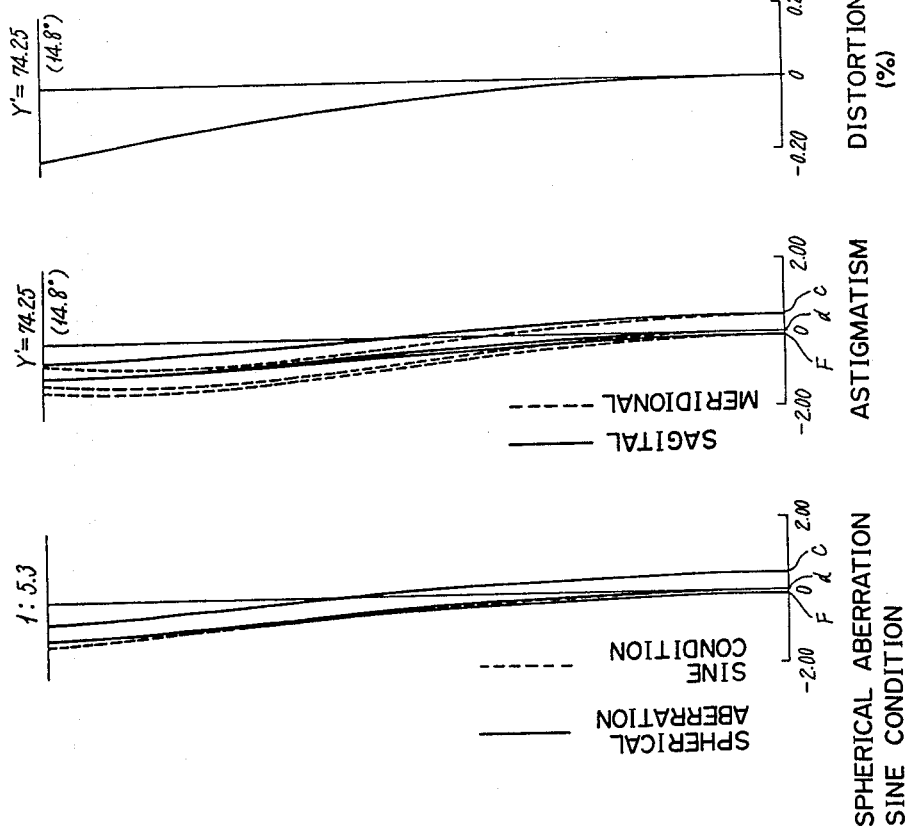
Figure 10:
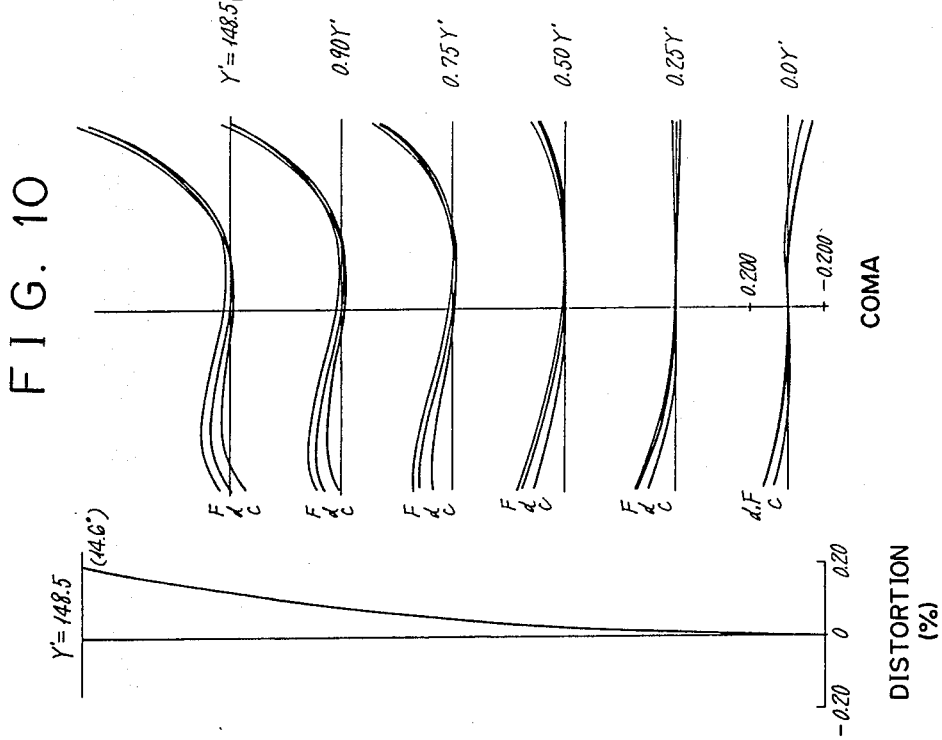
Figure 9:
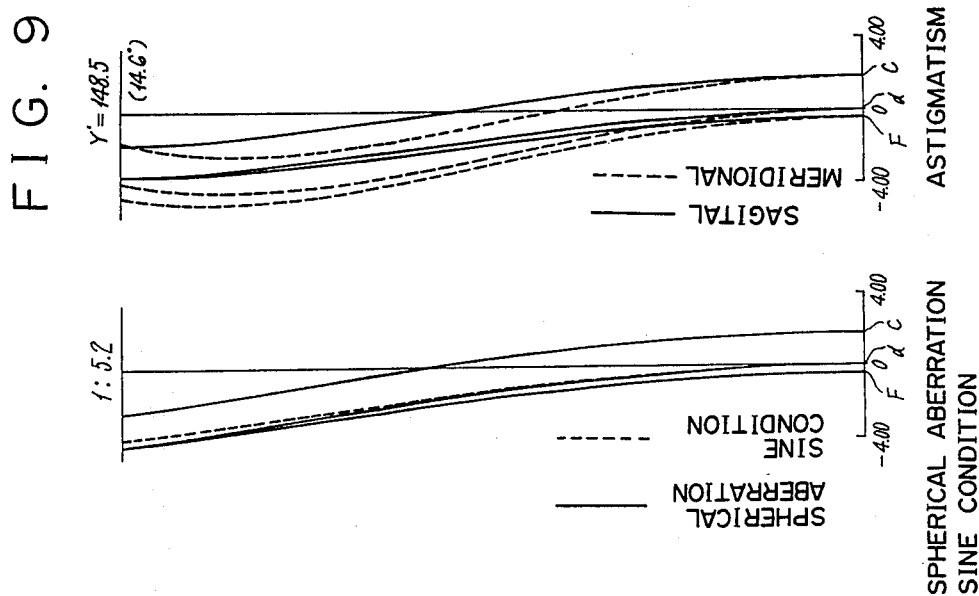

FIGS. 2 through 10 show the arrangement of a variable focus lens according to EXAMPLE 1 and the curves of aberrations and coma of the lens. FIG. 2 shows the arrangement of the variable focus lens at the equal-size magnification ratio, FIG. 3 shows aberration curves, FIG. 4 shows coma curves, FIG. 5 shows the arrangement of the variable focus lens when the magnification ratio is −0.5, FIG. 6 shows aberration curves, FIG. 7 shows coma curves, FIG. 8 shows the arrangement of the variable focus lens when the magnification ratio is −2.0, FIG. 9 shows aberration curves, and FIG. 10 shows coma curves.

EXAMPLE 2:

| | | | |
|---|---|---|---|
| M | −2.0 | −1.0 | −0.5 |
| F | 5.2 | 5.6 | 5.2 |
| f.l | 188.85 | 215.00 | 188.85 |
| $\omega$ | 14.6° | 19.1° | 14.7° |
| Y | −74.25 | −148.50 | −148.50 |
| Y' | 148.50 | 148.50 | 74.25 |
| $d_2$ | 9.882 | 0.515 | 10.923 |
| $d_8$ | 2.997 | 12.364 | 1.956 |
| $d_9$ | 1.956 | 12.364 | 2.997 |
| $d_{15}$ | 10.923 | 0.515 | 9.882 |
| $S_1$ | −244.484 | −385.167 | −525.851 |
| SL | 525.851 | 385.167 | 244.484 |
| U | 872.516 | 872.513 | 872.516 |

$f_2 = f_3 = 164.851 = 0.767f$, $r_6/f = 0.310$, $d_6/f = 0.0178$
$a = 10.408$, $b = -9.367$, $b/a = -0.900$, $L = 102.180$,
$P = 0.082$

| i | $r_i$ | $d_i$ | J | $n_j$ | $\nu_j$ |
|---|---|---|---|---|---|
| 1 | −109.468 | 3.194 | 1 | 1.51742 | 52.4 |
| 2 | −363.763 | Variable | | | |
| 3 | 87.854 | 15.214 | 2 | 1.78590 | 44.2 |
| 4 | −147.053 | 2.910 | | | |
| 5 | −122.331 | 9.561 | 3 | 1.62004 | 36.3 |
| 6 | 66.659 | 3.829 | | | |
| 7 | 212.096 | 3.503 | 4 | 1.64850 | 53.0 |
| 8 | −284.721 | Variable | | | |
| 9 | ∞ (Diaphragm) | Variable | | | |
| 10 | 284.721 | 3.503 | 5 | 1.64850 | 53.0 |

-continued

| | | | | | |
|---|---|---|---|---|---|
| 11 | −212.096 | 3.829 | | | |
| 12 | −66.659 | 9.561 | 6 | 1.62004 | 36.3 |
| 13 | 122.331 | 2.910 | | | |
| 14 | 147.053 | 15.214 | 7 | 1.78590 | 44.2 |
| 15 | −87.854 | Variable | | | |
| 16 | 363.763 | 3.194 | 8 | 1.51742 | 52.4 |
| 17 | 109.468 | | | | |

FIGS. 11 through 19 show the arrangement of a variable focus lens according to EXAMPLE 2 and the curves of aberrations and coma of the lens. FIG. 11 shows the arrangement of the variable focus lens at the equal-size magnification ratio, FIG. 12 shows aberration curves, FIG. 13 shows coma curves, FIG. 14 shows the arrangement of the variable focus lens when the magnification ratio is −0.5, FIG. 15 shows aberration curves, FIG. 16 shows coma curves, FIG. 17 shows the arrangement of the variable focus lens when the magnification ratio is −2.0, FIG. 18 shows aberration curves, and FIG. 19 shows coma curves.

EXAMPLE 3:

| M | −2.0 | −1.0 | −0.5 |
|---|---|---|---|
| F | 5.1 | 5.6 | 5.1 |
| f.l | 190.14 | 215.00 | 190.14 |
| ω | 14.5° | 19.1° | 14.6° |
| Y | −74.25 | −148.50 | −148.50 |
| Y' | 148.50 | 148.50 | 74.25 |
| $d_2$ | 5.235 | 0.527 | 5.758 |
| $d_8$ | 2.352 | 7.060 | 1.829 |
| $d_9$ | 1.829 | 7.060 | 2.352 |
| $d_{15}$ | 5.758 | 0.527 | 5.235 |
| $S_1$ | −250.585 | −392.570 | −534.562 |
| SL | 534.562 | 392.570 | 250.585 |
| U | 879.343 | 879.335 | 879.343 |

$f_2 = f_3 = 126.443 = 0.588f$, $r_6/f = 0.328$, $d_6/f = 0.0249$
$a = 5.231$, $b = -4.708$, $b/a = -0.900$, $L = 94.196$,
$P = 0.098$

| i | $r_i$ | $d_i$ | J | $n_j$ | $v_j$ |
|---|---|---|---|---|---|
| 1 | −90.069 | 3.432 | 1 | 1.51742 | 52.4 |
| 2 | −8485.042 | Variable | | | |
| 3 | 82.275 | 16.183 | 2 | 1.72000 | 43.7 |
| 4 | −122.347 | 4.427 | | | |
| 5 | −100.046 | 6.427 | 3 | 1.62004 | 36.3 |
| 6 | 70.439 | 5.344 | | | |
| 7 | 303.804 | 3.698 | 4 | 1.64850 | 53.0 |
| 8 | −114.741 | Variable | | | |
| 9 | ∞ (Diaphragm) | Variable | | | |
| 10 | 114.741 | 3.698 | 5 | 1.64850 | 53.0 |
| 11 | −303.804 | 5.344 | | | |
| 12 | −70.439 | 6.427 | 6 | 1.62004 | 36.3 |
| 13 | 100.046 | 4.427 | | | |
| 14 | 122.347 | 16.183 | 7 | 1.72000 | 43.7 |
| 15 | −82.275 | Variable | | | |
| 16 | 8485.042 | 3.432 | 8 | 1.51742 | 52.4 |
| 17 | 90.069 | | | | |

Figure 28:
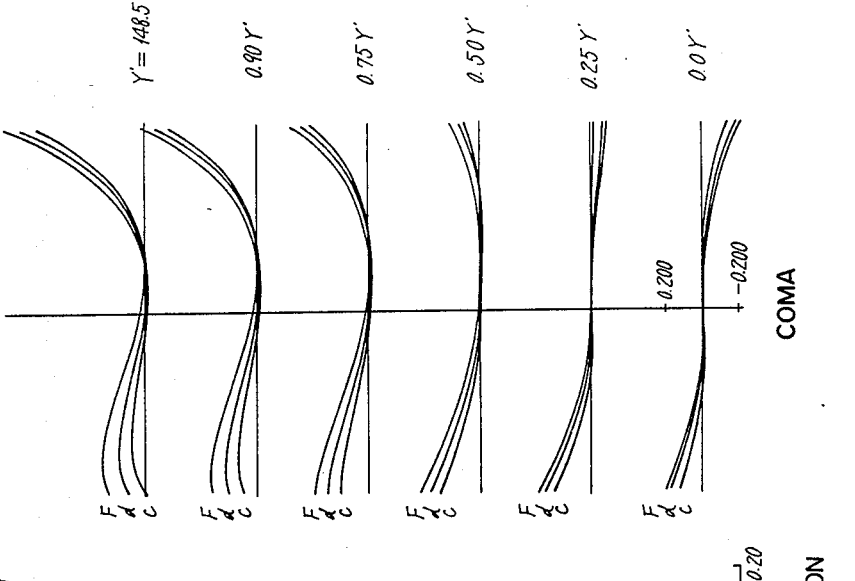
Figure 27:
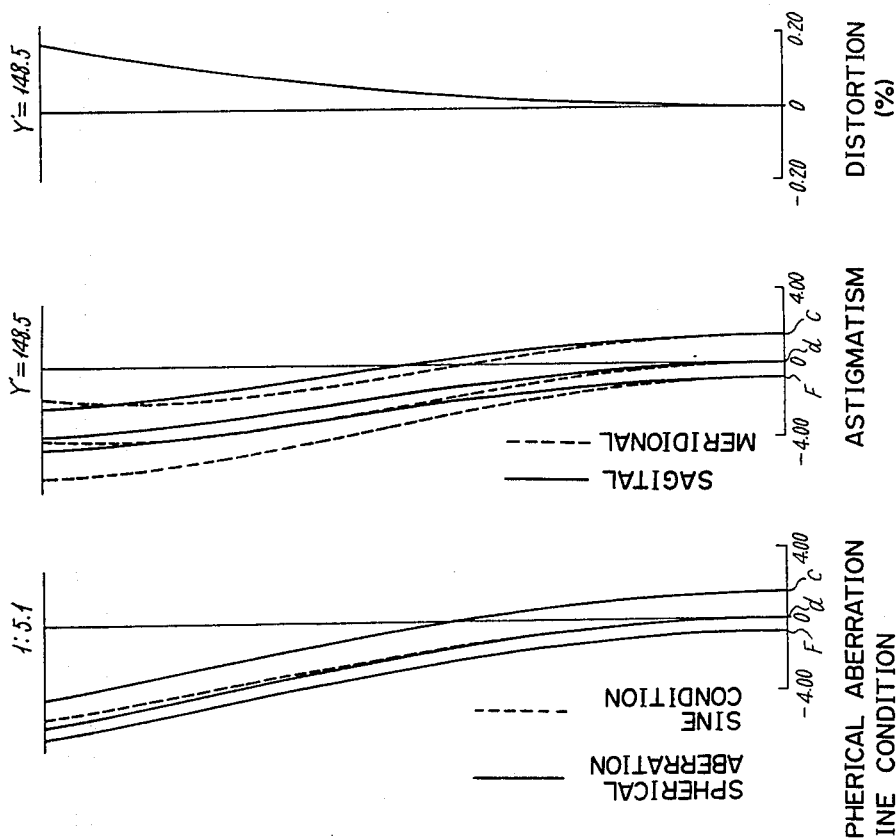

FIGS. 20 through 28 show the arrangement of a variable focus lens according to EXAMPLE 3 and the curves of aberrations and coma of the lens. FIG. 20 shows the arrangement of the variable focus lens at the equal-size magnification ratio, FIG. 21 shows aberration curves, FIG. 22 shows coma curves, FIG. 23 shows the arrangement of the variable focus lens when the magnification ratio is −0.5, FIG. 24 shows aberration curves, FIG. 25 shows coma curves, FIG. 26 shows the arrangement of the variable focus lens when the magnification ratio is −2.0, FIG. 27 shows aberration curves, and FIG. 28 shows coma curves.

EXAMPLE 4:

| M | −2.0 | −1.0 | −0.5 |
|---|---|---|---|
| F | 5.2 | 5.6 | 5.3 |
| f.l | 188.14 | 215.00 | 188.14 |
| ω | 14.6° | 19.1° | 14.8° |
| Y | −74.25 | −148.50 | −148.50 |
| Y' | 148.50 | 148.50 | 74.25 |
| $d_2$ | 12.428 | 0.488 | 13.755 |
| $d_8$ | 3.423 | 15.363 | 2.096 |
| $d_9$ | 2.096 | 15.363 | 3.423 |
| $d_{15}$ | 13.755 | 0.488 | 12.428 |
| $S_1$ | −240.778 | −380.784 | −520.792 |
| SL | 520.792 | 380.784 | 240.778 |
| U | 868.080 | 868.079 | 868.080 |

$f_2 = f_3 = 182.890 = 0.851f$, $r_6/f = 0.308$, $d_6/f = 0.0204$
$a = 13.267$, $b = -11.940$, $b/a = -0.900$, $L = 106.510$,
$P = 0.087$

| i | $r_i$ | $d_i$ | J | $n_j$ | $v_j$ |
|---|---|---|---|---|---|
| 1 | −111.051 | 3.074 | 1 | 1.54072 | 47.2 |
| 2 | −243.132 | Variable | | | |
| 3 | 86.794 | 15.120 | 2 | 1.78590 | 44.2 |
| 4 | −144.746 | 2.528 | | | |
| 5 | −120.281 | 9.159 | 3 | 1.62004 | 36.3 |
| 6 | 66.213 | 4.385 | | | |
| 7 | 228.198 | 3.138 | 4 | 1.65844 | 50.9 |
| 8 | −384.780 | Variable | | | |
| 9 | ∞ (Diaphragm) | Variable | | | |
| 10 | 384.780 | 3.138 | 5 | 1.65844 | 50.9 |
| 11 | −228.198 | 4.385 | | | |
| 12 | −66.213 | 9.159 | 6 | 1.62004 | 36.3 |
| 13 | 120.281 | 2.528 | | | |
| 14 | 144.746 | 15.120 | 7 | 1.78590 | 44.2 |
| 15 | −86.794 | Variable | | | |
| 16 | 243.132 | 3.074 | 8 | 1.54072 | 47.2 |
| 17 | 111.051 | | | | |

Figure 34:
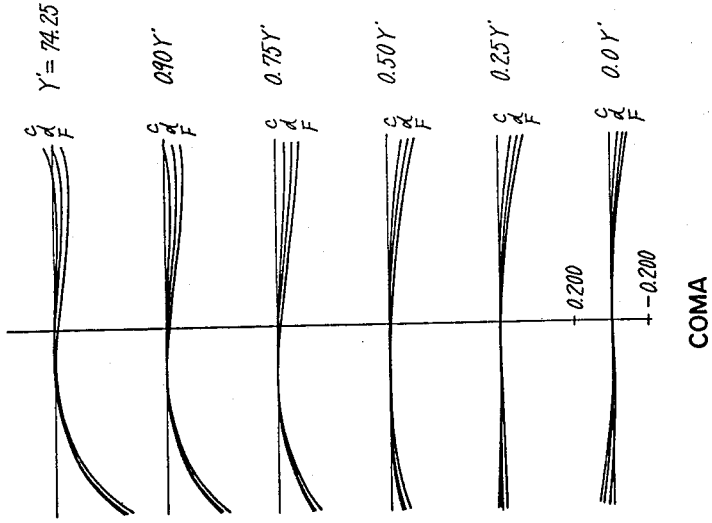
Figure 33:
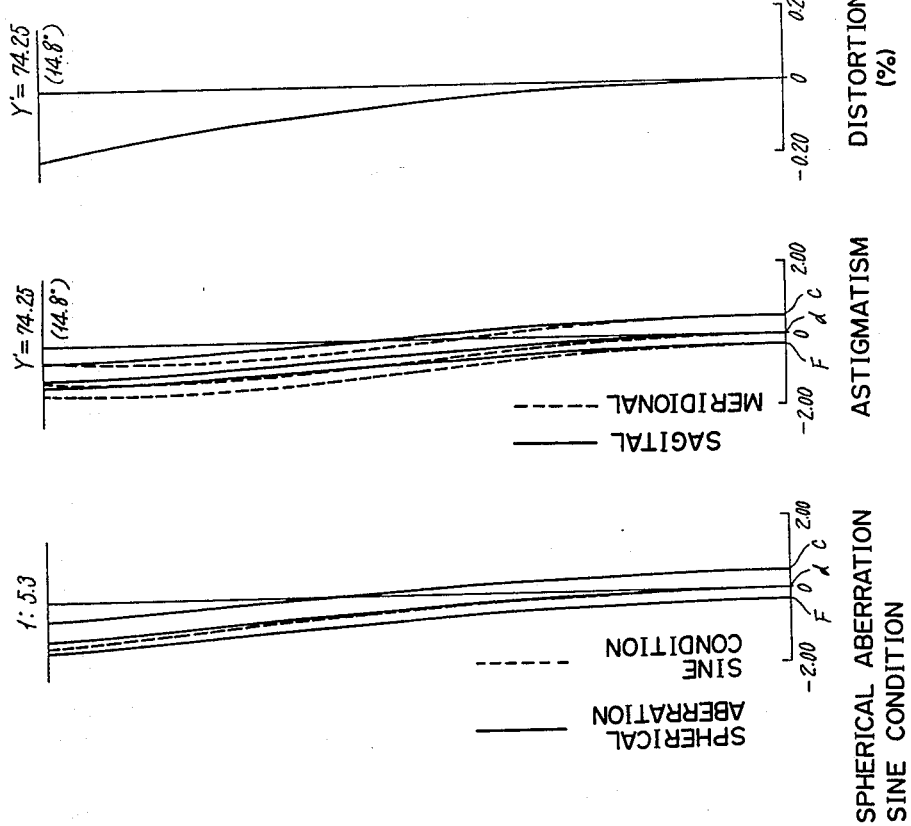
Figure 37:
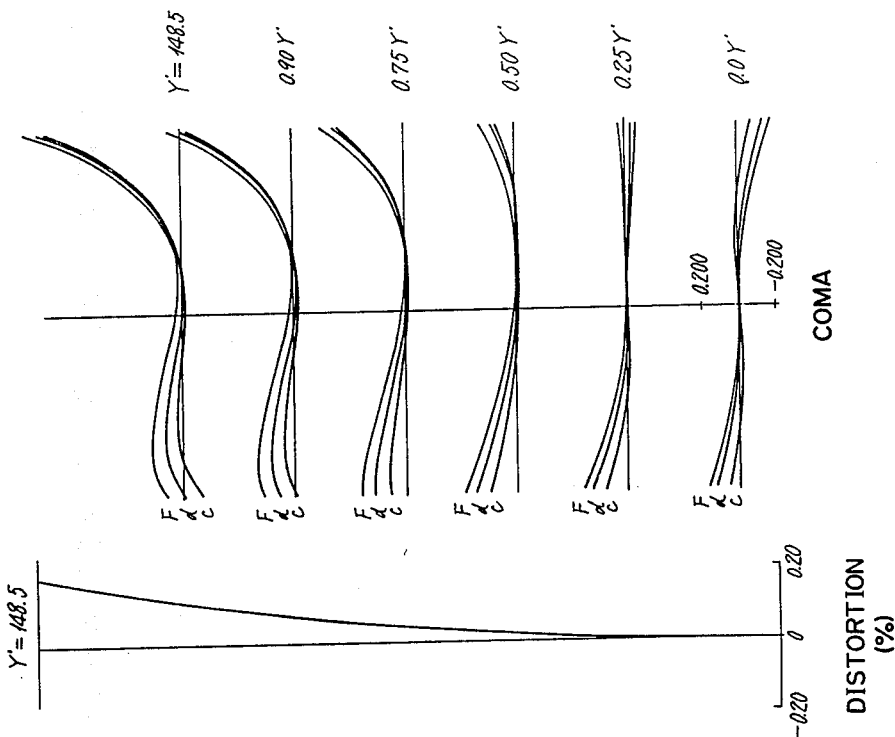
Figure 36:
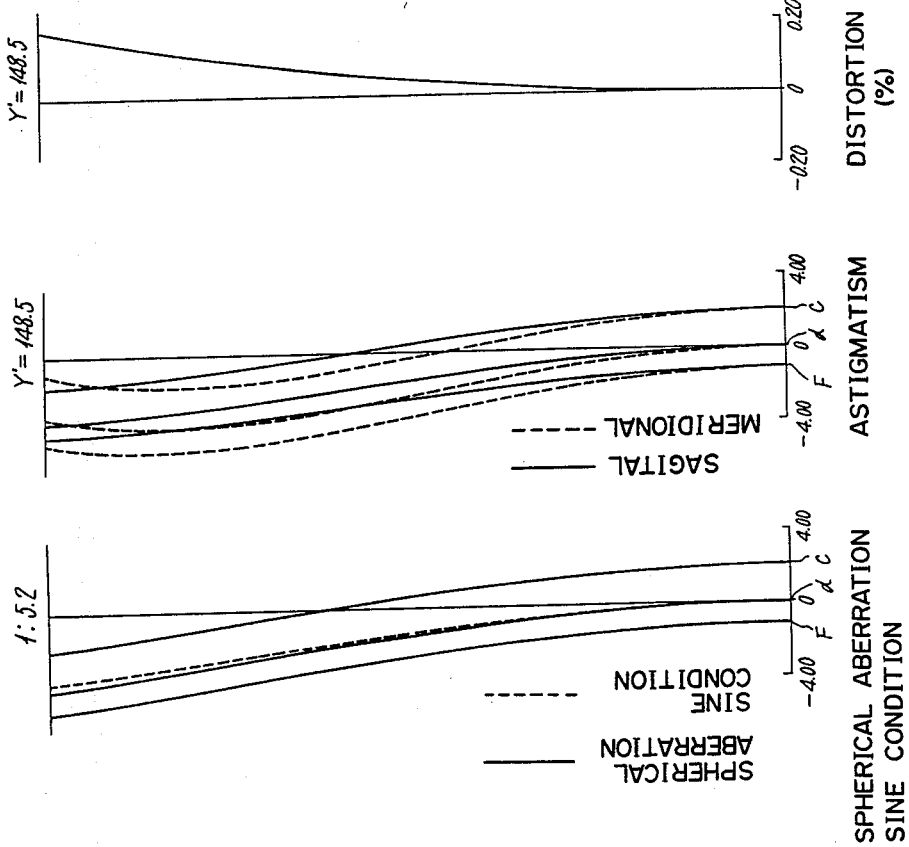

FIGS. 29 through 37 show the arrangement of a variable focus lens according to EXAMPLE 4 and the curves of aberrations and coma of the lens. FIG. 29 shows the arrangement of the variable focus lens at the equal-size magnification ratio, FIG. 30 shows aberration curves, FIG. 31 shows coma curves, FIG. 32 shows the arrangement of the variable focus lens when the magnification ratio is −0.5, FIG. 33 shows aberration curves, FIG. 34 shows coma curves, FIG. 35 shows the arrangement of the variable focus lens when the magnification ratio is −2.0, FIG. 36 shows aberration curves, and FIG. 37 shows coma curves.

EXAMPLE 5:

| M | −2.0 | −1.0 | −0.5 |
|---|---|---|---|
| F | 5.2 | 5.6 | 5.3 |
| f.l | 188.12 | 215.00 | 188.12 |
| ω | 14.7° | 19.1° | 14.8° |
| Y | −74.25 | −148.50 | −148.50 |
| Y' | 148.50 | 148.50 | 74.25 |
| $d_2$ | 12.452 | 0.488 | 13.782 |
| $d_8$ | 3.411 | 15.375 | 2.081 |
| $d_9$ | 2.081 | 15.375 | 3.411 |
| $d_{15}$ | 13.782 | 0.488 | 12.452 |
| $S_1$ | −240.553 | −380.546 | −520.540 |
| SL | 520.540 | 380.546 | 240.553 |
| U | 869.138 | 869.136 | 869.138 |

$f_2 = f_3 = 183.035 = 0.851f$, $r_6/f = 0.300$, $d_6/f = 0.0183$
$a = 13.294$, $b = -11.964$, $b/a = -0.900$, $L = 108.044$,
$P = 0.075$

| i | $r_i$ | $d_i$ | J | $n_j$ | $v_j$ |
|---|---|---|---|---|---|
| 1 | −113.636 | 4.060 | 1 | 1.51823 | 59.0 |
| 2 | −270.526 | Variable | | | |
| 3 | 85.133 | 15.261 | 2 | 1.78590 | 44.2 |
| 4 | −153.436 | 2.560 | | | |

-continued

| | | | | | |
|---|---|---|---|---|---|
| 5 | −126.933 | 8.745 | 3 | 1.62004 | 36.3 |
| 6 | 64.564 | 3.932 | | | |
| 7 | 204.831 | 3.601 | 4 | 1.65160 | 58.5 |
| 8 | −439.671 | Variable | | | |
| 9 | ∞ (Diaphragm) | Variable | | | |
| 10 | 439.671 | 3.601 | 5 | 1.65160 | 58.5 |
| 11 | −204.831 | 3.932 | | | |
| 12 | −64.564 | 8.745 | 6 | 1.62004 | 36.3 |
| 13 | 126.933 | 2.560 | | | |
| 14 | 153.436 | 15.261 | 7 | 1.78590 | 44.2 |
| 15 | −85.133 | Variable | | | |
| 16 | 270.526 | 4.060 | 8 | 1.51823 | 59.0 |
| 17 | 113.636 | | | | |

Figure 40:
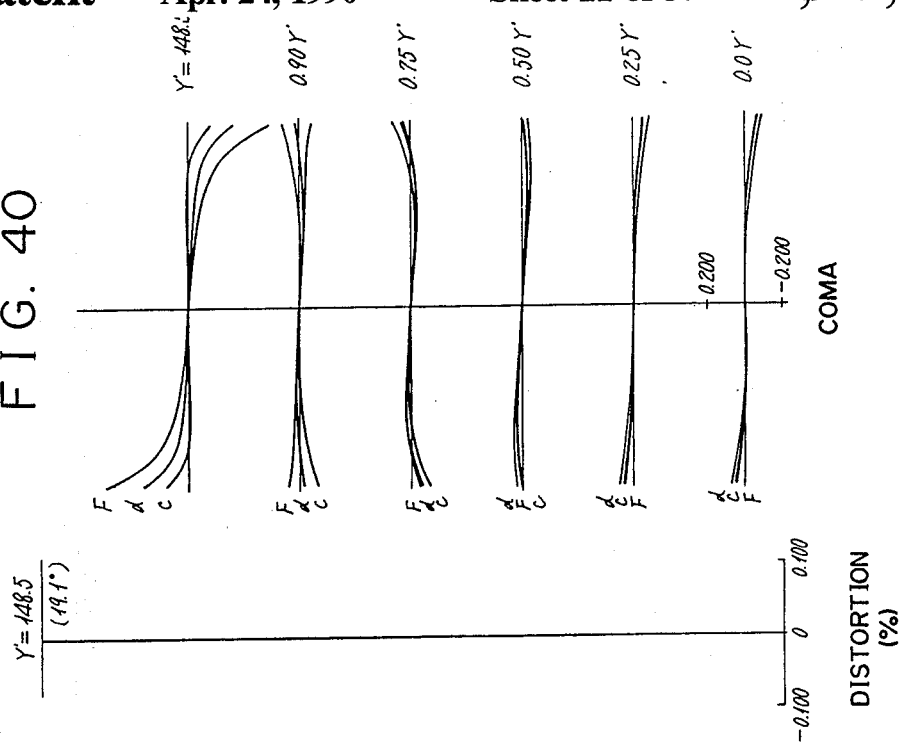
Figure 39:
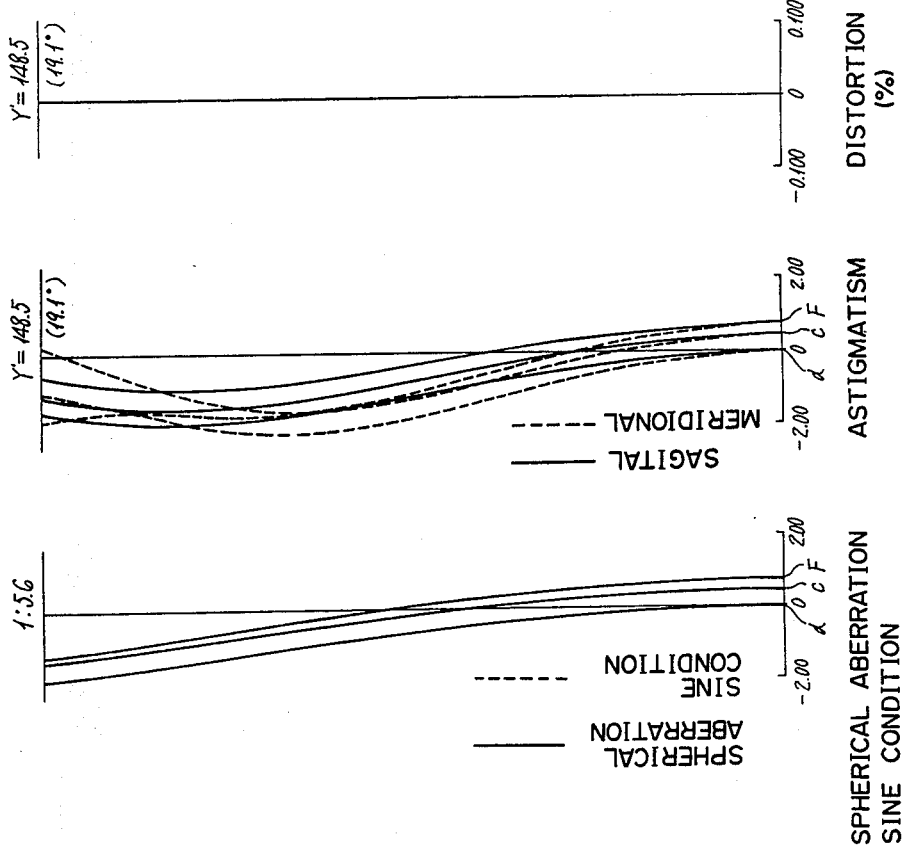
Figure 46:
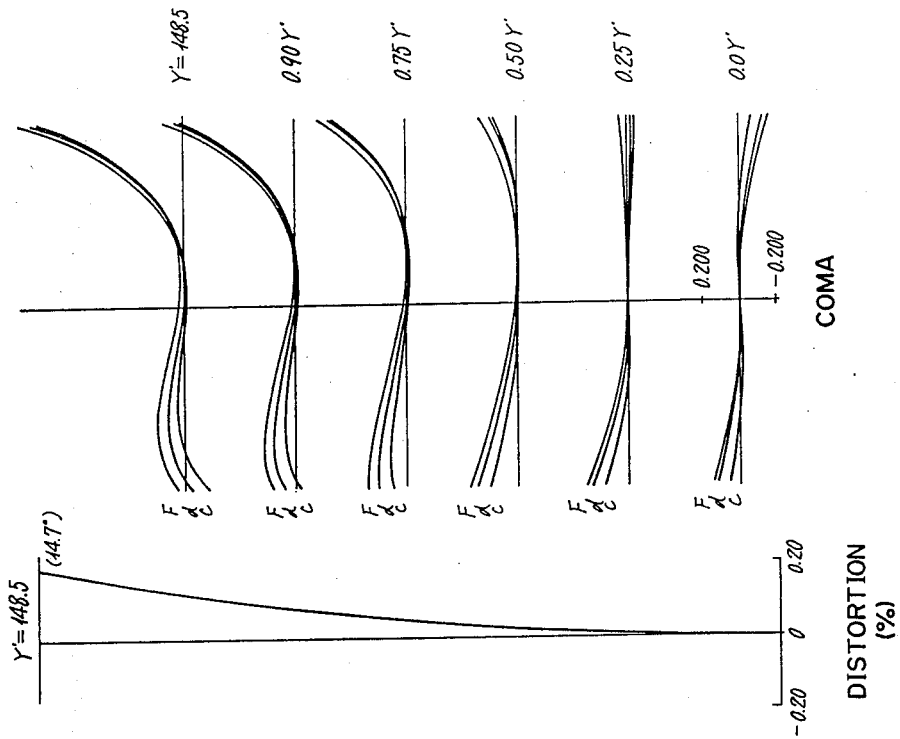
Figure 45:
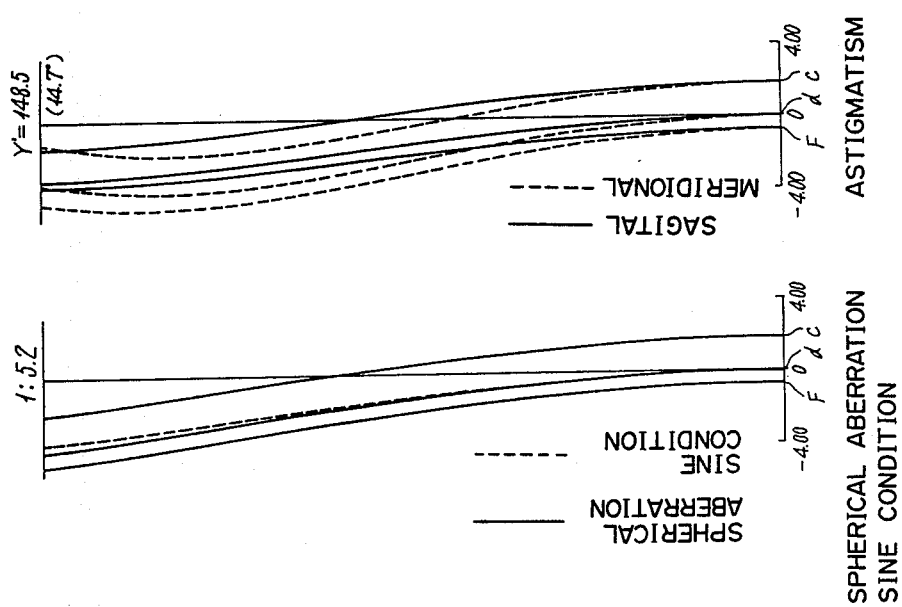

FIGS. 38 through 46 show the arrangement of a variable focus lens according to EXAMPLE 5 and the curves of aberrations and coma of the lens. FIG. 38 shows the arrangement of the variable focus lens at the equal-size magnification ratio, FIG. 39 shows aberration curves, FIG. 40 shows coma curves, FIG. 41 shows the arrangement of the variable focus lens when the magnification ratio is −0.5, FIG. 42 shows aberration curves, FIG. 43 shows coma curves, FIG. 44 shows the arrangement of the variable focus lens when the magnification ratio is −2.0, FIG. 45 shows aberration curves, and FIG. 46 shows coma curves.

EXAMPLE 6:

| | | | |
|---|---|---|---|
| M | −2.0 | −1.0 | −0.5 |
| F | 5.2 | 5.6 | 5.3 |
| f.l | 188.86 | 215.00 | 188.86 |
| ω | 14.4° | 19.1° | 14.8° |
| Y | −74.25 | −148.50 | −148.50 |
| Y' | 148.50 | 148.50 | 74.25 |
| $d_2$ | 8.652 | 0.515 | 12.139 |
| $d_8$ | 4.229 | 12.366 | 0.742 |
| $d_9$ | 0.742 | 12.366 | 4.229 |
| $d_{15}$ | 12.139 | 0.515 | 8.652 |
| $S_1$ | −247.364 | −385.819 | −524.271 |
| SL | 524.271 | 385.819 | 247.364 |
| U | 872.647 | 872.651 | 872.647 |

$f_2 = f_3 = 164.881 = 0.767f$, $r_6/f = 0.310$, $d_6/f = 0.0163$
$a = 11.624$, $b = -8.137$, $b/a = -0.700$, $L = 101.012$,
$P = 0.081$

| i | $r_i$ | $d_i$ | J | $n_j$ | $v_j$ |
|---|---|---|---|---|---|
| 1 | −108.261 | 3.182 | 1 | 1.51742 | 52.4 |
| 2 | −350.775 | Variable | | | |
| 3 | 88.252 | 14.864 | 2 | 1.78590 | 44.2 |
| 4 | −143.145 | 2.851 | | | |
| 5 | −120.173 | 9.563 | 3 | 1.62004 | 36.3 |
| 6 | 66.560 | 3.513 | | | |
| 7 | 202.994 | 3.652 | 4 | 1.64850 | 53.0 |
| 8 | −302.076 | Variable | | | |
| 9 | ∞ (Diaphragm) | Variable | | | |
| 10 | 302.076 | 3.652 | 5 | 1.64850 | 53.0 |
| 11 | −202.994 | 3.513 | | | |
| 12 | −66.560 | 9.563 | 6 | 1.62004 | 36.3 |
| 13 | 120.173 | 2.851 | | | |
| 14 | 143.145 | 14.864 | 7 | 1.78590 | 44.2 |
| 15 | −88.252 | Variable | | | |
| 16 | 350.775 | 3.182 | 8 | 1.51742 | 52.4 |
| 17 | 108.261 | | | | |

Figure 52:
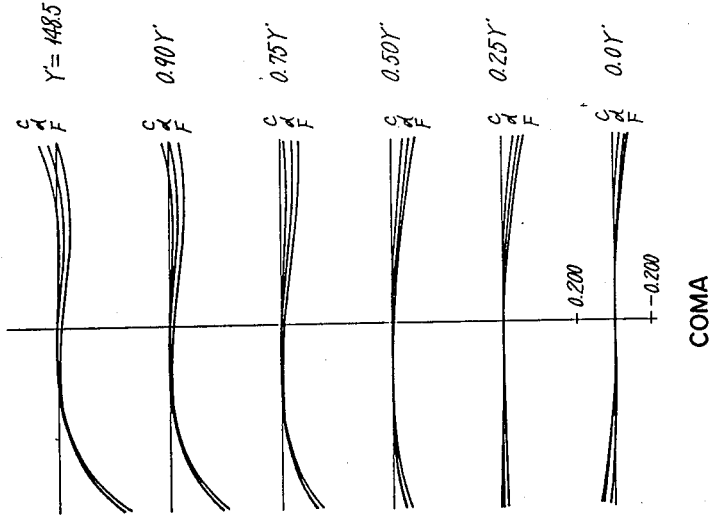
Figure 51:
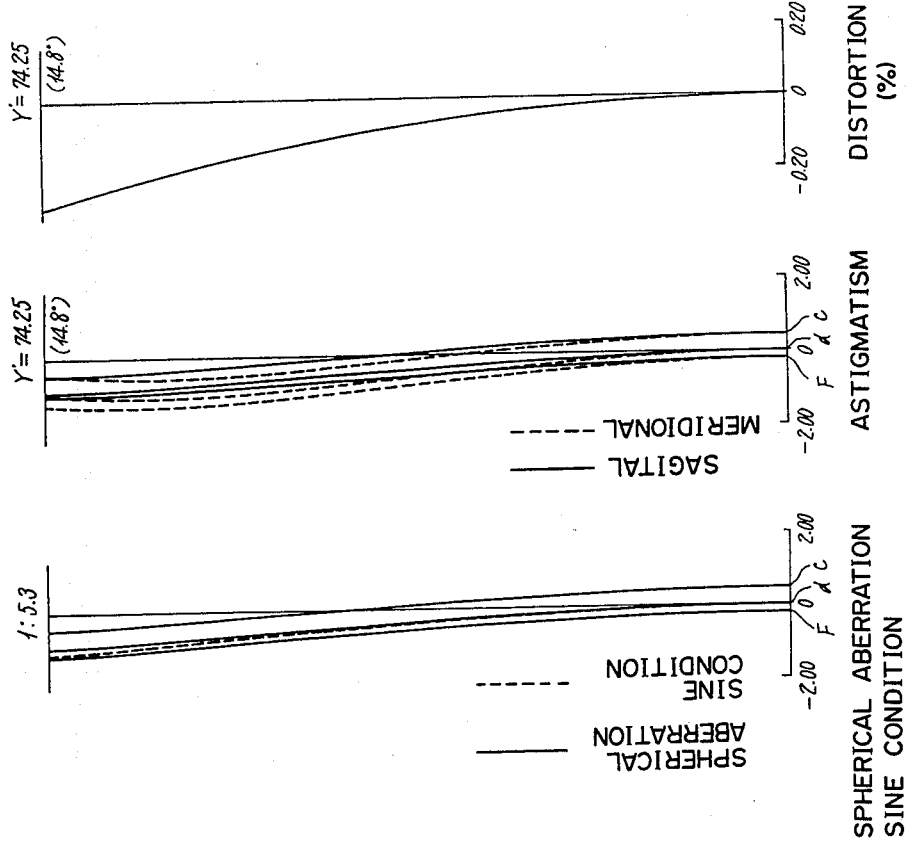
Figure 55:
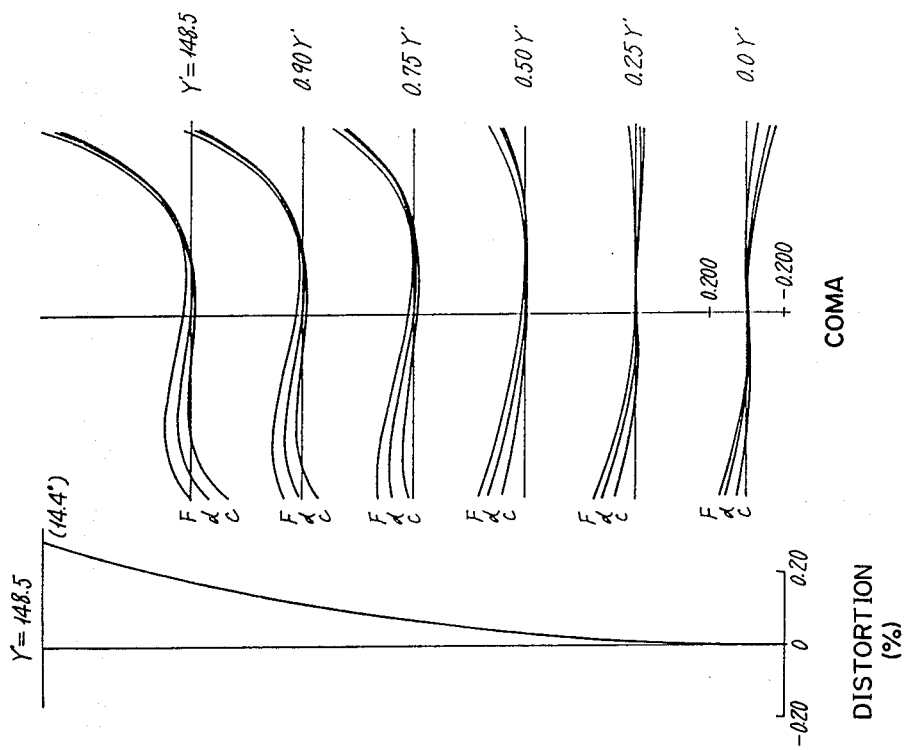
Figure 54:
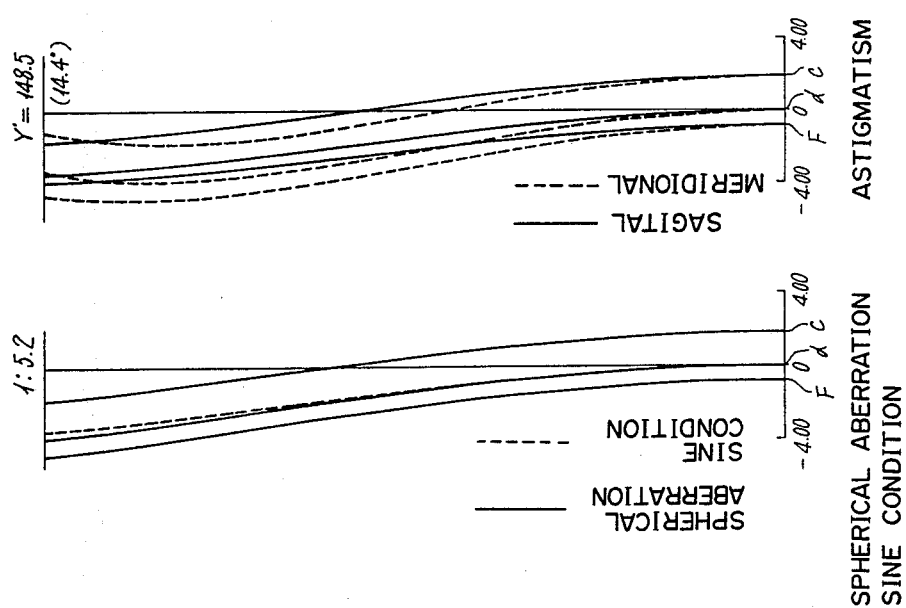

FIGS. 47 through 55 show the arrangement of a variable focus lens according to EXAMPLE 6 and the curves of aberrations and coma of the lens. FIG. 47 shows the arrangement of the variable focus lens at the equal-size magnification ratio, FIG. 48 shows aberration curves, FIG. 49 shows coma curves, FIG. 50 shows the arrangement of the variable focus lens when the magnification ratio is −0.5, FIG. 41 shows aberration curves, FIG. 52 shows coma curves, FIG. 53 shows the arrangement of the variable focus lens when the magnification ratio is −2.0, FIG. 54 shows aberration curves, and FIG. 55 shows coma curves.

EXAMPLE 7:

| | | | |
|---|---|---|---|
| M | −2.0 | −1.0 | −0.5 |
| F | 5.2 | 5.6 | 5.2 |
| f.l | 188.88 | 215.00 | 188.88 |
| ω | 14.7° | 19.1° | 14.7° |
| Y | −74.25 | −148.50 | −148.50 |
| Y' | 148.50 | 148.50 | 74.25 |
| $d_2$ | 10.434 | 0.517 | 10.434 |
| $d_8$ | 1.492 | 11.409 | 1.492 |
| $d_9$ | 1.492 | 11.409 | 1.492 |
| $d_{15}$ | 10.434 | 0.517 | 10.434 |
| $S_1$ | −244.047 | −385.707 | −527.365 |
| SL | 527.365 | 385.707 | 244.047 |
| U | 874.065 | 874.065 | 874.065 |

$f_2 = f_3 = 165.509 = 0.770f$, $r_6/f = 0.311$, $d_6/f = 0.0180$
$a = 9.917$, $b = -9.917$, $b/a = -1.0$, $L = 102.652$,
$P = 0.082$

| i | $r_i$ | $d_i$ | J | $n_j$ | $v_j$ |
|---|---|---|---|---|---|
| 1 | −109.004 | 3.277 | 1 | 1.51742 | 52.4 |
| 2 | −355.653 | Variable | | | |
| 3 | 89.357 | 16.227 | 2 | 1.78590 | 44.2 |
| 4 | −142.284 | 2.768 | | | |
| 5 | −120.518 | 9.599 | 3 | 1.62004 | 36.3 |
| 6 | 66.854 | 3.875 | | | |
| 7 | 196.658 | 3.654 | 4 | 1.64850 | 53.0 |
| 8 | −316.251 | Variable | | | |
| 9 | ∞ (Diaphragm) | Variable | | | |
| 10 | 316.251 | 3.654 | 5 | 1.64850 | 53.0 |
| 11 | −196.658 | 3.875 | | | |
| 12 | −66.854 | 9.599 | 6 | 1.62004 | 36.3 |
| 13 | 120.518 | 2.768 | | | |
| 14 | 142.284 | 16.227 | 7 | 1.78590 | 44.2 |
| 15 | −89.357 | Variable | | | |
| 16 | 355.653 | 3.277 | 8 | 1.51742 | 52.4 |
| 17 | 109.004 | | | | |

Figure 61:
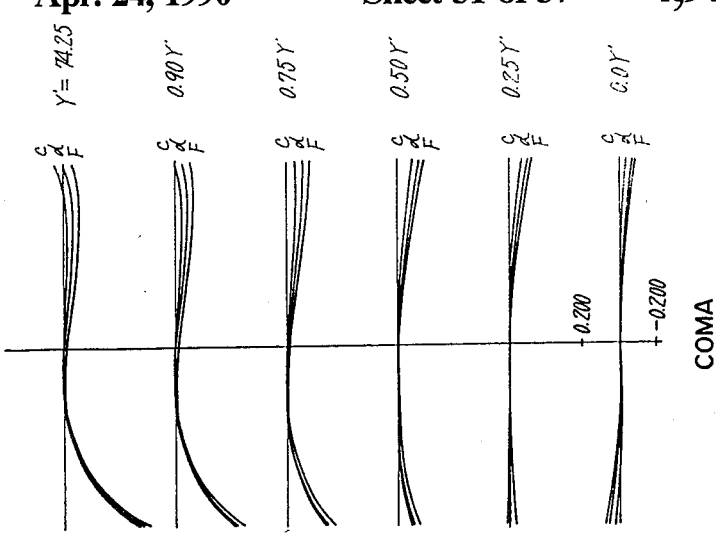
Figure 60:
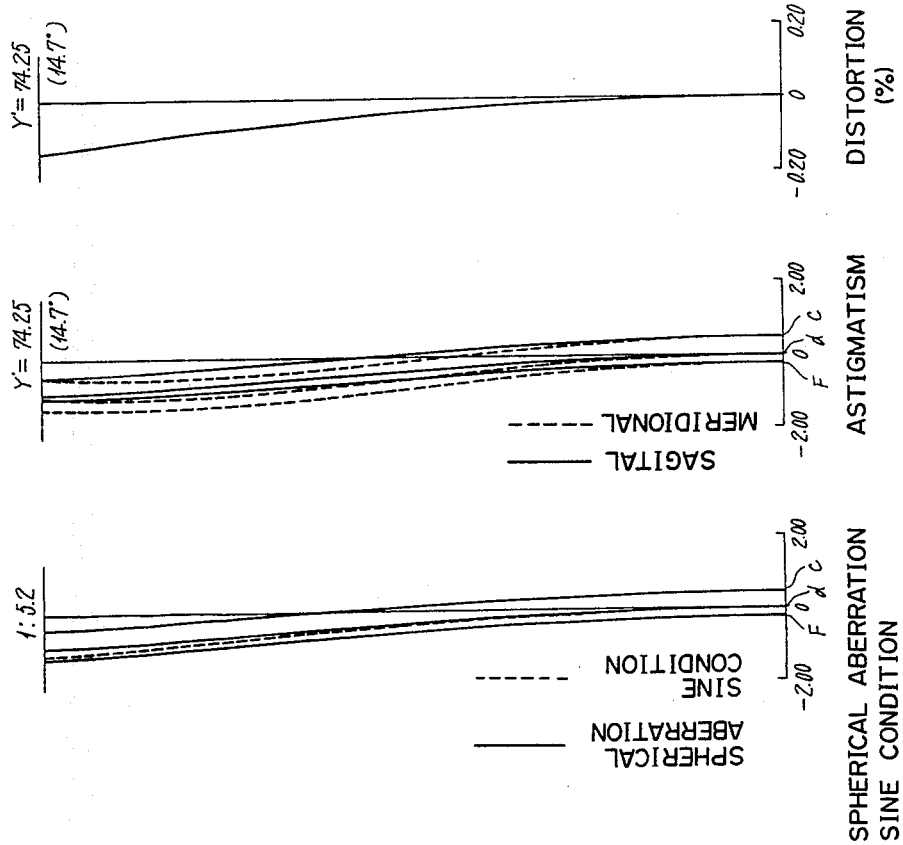
Figure 63:
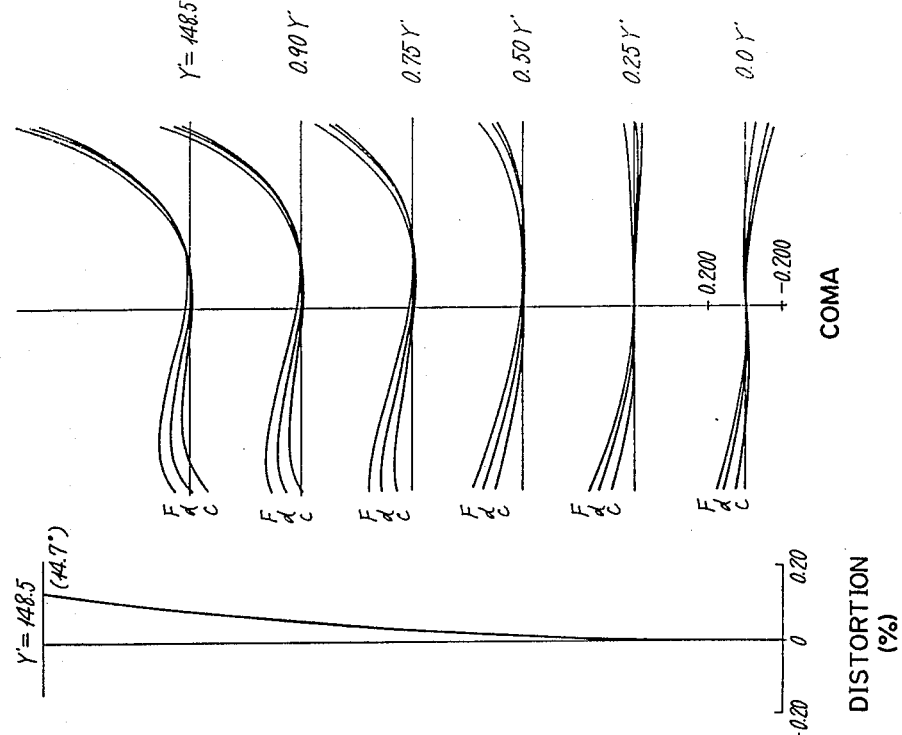
Figure 64:
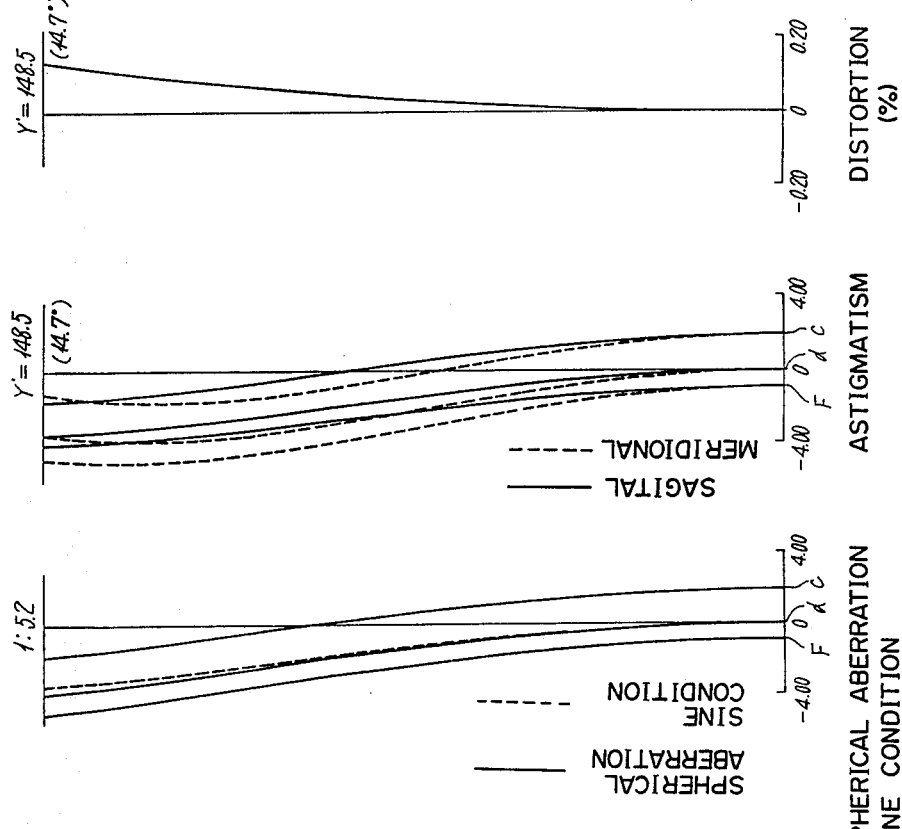

FIGS. 56 through 64 show the arrangement of a variable focus lens according to EXAMPLE 7 and the curves of aberrations and coma of the lens. FIG. 56 shows the arrangement of the variable focus lens at the equal-size magnification ratio, FIG. 57 shows aberration curves, FIG. 58 shows coma curves, FIG. 59 shows the arrangement of the variable focus lens when the magnification ratio is −0.5, FIG. 60 shows aberration curves, FIG. 61 shows coma curves, FIG. 62 shows the arrangement of the variable focus lens when the magnification ratio is −2.0, FIG. 63 shows aberration curves, and FIG. 64 shows coma curves.

EXAMPLE 8:

| | | | |
|---|---|---|---|
| M | −2.0 | −1.0 | −0.5 |
| F | 5.3 | 5.6 | 5.2 |
| f.l | 188.76 | 214.97 | 188.76 |
| ω | 15.0° | 19.1° | 14.6° |
| Y | −74.25 | −148.50 | −148.50 |
| Y' | 148.50 | 148.50 | 74.25 |
| $d_2$ | 11.796 | 0.497 | 8.971 |
| $d_8$ | 1.611 | 12.910 | 4.436 |
| $d_9$ | 4.436 | 12.910 | 1.611 |
| $d_{15}$ | 8.971 | 0.497 | 11.796 |
| $S_1$ | −240.012 | −384.155 | −528.298 |
| SL | 528.298 | 384.155 | 240.012 |
| U | 872.852 | 872.852 | 872.852 |

$f_2 = f_3 = 164.362 = 0.765f$, $r_6/f = 0.310$, $d_6/f = 0.0174$
$a = 8.474$, $b = -11.299$, $b/a = -1.333$, $L = 104.542$,
$P = 0.081$

-continued

| i | $r_i$ | $d_i$ | J | $n_j$ | $\nu_j$ |
|---|---|---|---|---|---|
| 1 | −107.809 | 3.098 | 1 | 1.51742 | 52.4 |
| 2 | −348.448 | Variable | | | |
| 3 | 88.600 | 16.346 | 2 | 1.78590 | 44.2 |
| 4 | −138.582 | 2.625 | | | |
| 5 | −117.228 | 9.532 | 3 | 1.62004 | 36.3 |
| 6 | 66.746 | 3.751 | | | |
| 7 | 210.644 | 3.512 | 4 | 1.64850 | 53.0 |
| 8 | −288.813 | Variable | | | |
| 9 | ∞ (Diaphragm) | Variable | | | |
| 10 | 288.813 | 3.512 | 5 | 1.64850 | 53.0 |
| 11 | −210.644 | 3.751 | | | |
| 12 | −66.746 | 9.532 | 6 | 1.62004 | 36.3 |
| 13 | 117.228 | 2.625 | | | |
| 14 | 138.582 | 16.346 | 7 | 1.78590 | 44.2 |
| 15 | −88.600 | Variable | | | |
| 16 | 348.448 | 3.098 | 8 | 1.51742 | 52.4 |
| 17 | 107.809 | | | | |

Figure 67:
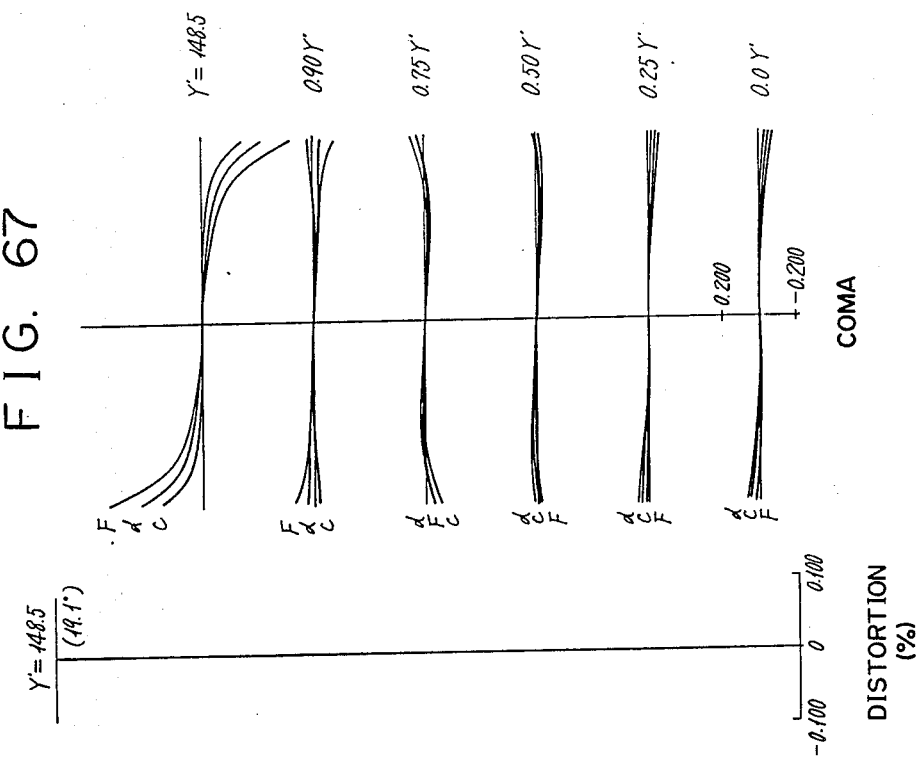
Figure 66:
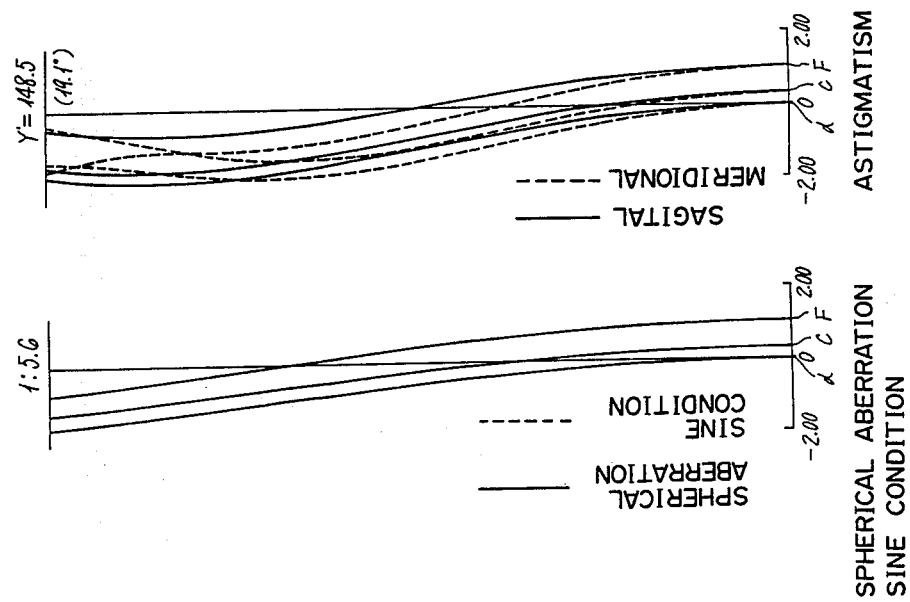
Figure 70:
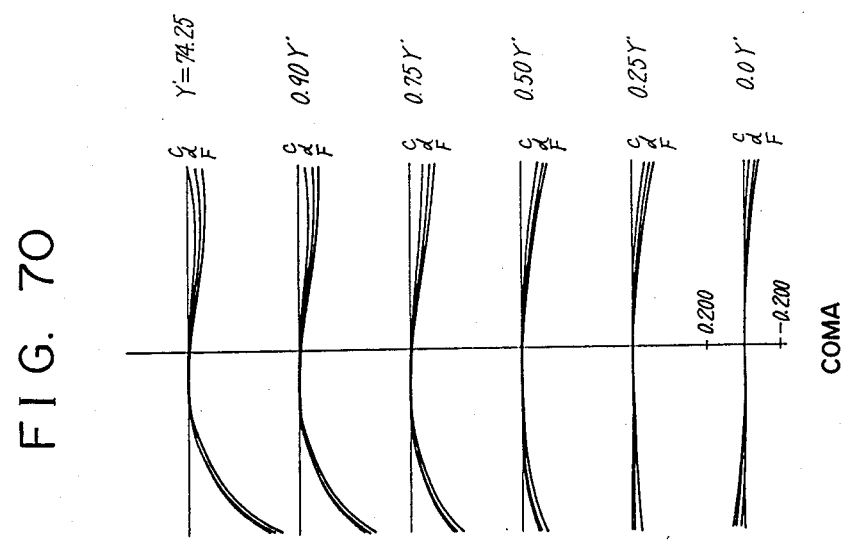
Figure 69:
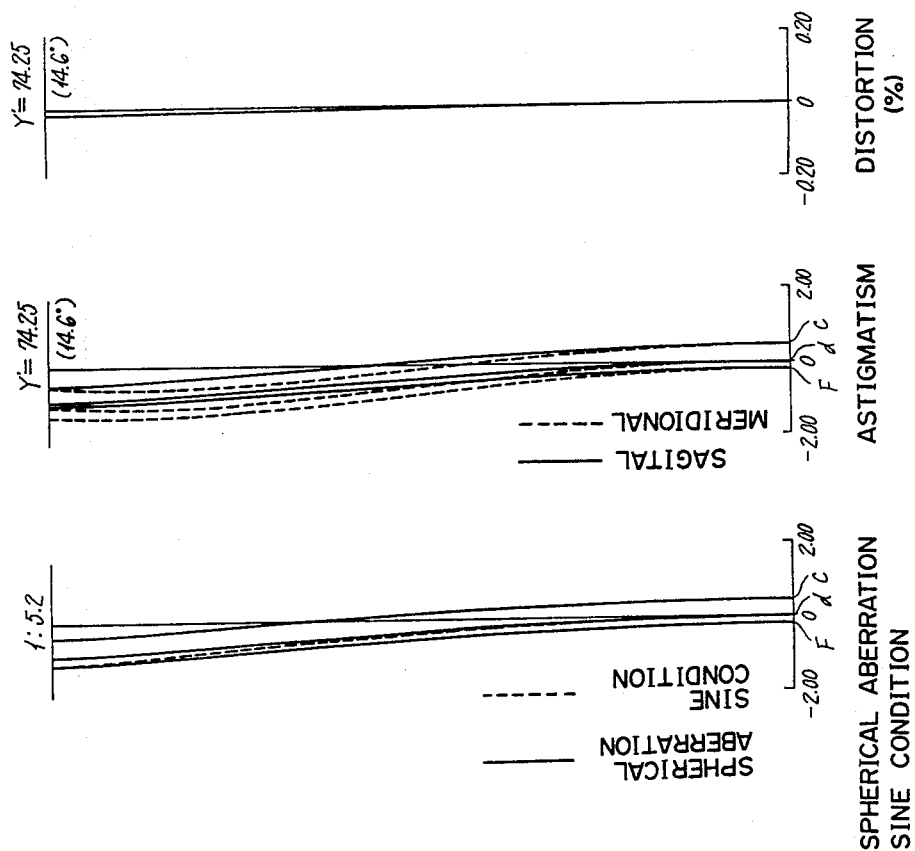

FIGS. 65 through 73 show the arrangement of a variable focus lens according to EXAMPLE 8 and the curves of aberrations and coma of the lens. FIG. 65 shows the arrangement of the variable focus lens at the equal-size magnification ratio, FIG. 66 shows aberration curves, FIG. 67 shows coma curves, FIG. 68 shows the arrangement of the variable focus lens when the magnification ratio is −0.5, FIG. 69 shows aberration curves, FIG. 70 shows coma curves, FIG. 71 shows the arrangement of the variable focus lens when the magnification ratio is −2.0, FIG. 72 shows aberration curves, and FIG. 73 shows coma curves.

In EXAMPLE 7, the second and third lens groups are moved symmetrically with respect to the diaphragm for varying the magnification ratio. In other EXAMPLES, the second and third lens groups are moved with respect to the diaphragm for varying the magnification ratio.

Although a certain preferred embodiment has been shown and described, it should be understood that many changes and modifications may be made therein without departing from the scope of the appended claims.

What is claimed is:

1. A variable focus lens for use in image reproduction, comprising:
   first, second, third, and fourth lens groups arranged successively from an object to an image; and
   a diaphragm disposed between the second and third lens groups;
   said first lens group comprising a concave meniscus lens with its concave surface facing the object;
   said second lens group comprising a double convex lens with the larger absolute value of the radius of curvature of its surface facing the image, a double concave lens with the larger absolute value of the radius of curvature of its surface facing the object, and a double convex lens, said lenses of the second lens group being arranged successively in the order named from the object;
   said third lens group being of the same construction as the second lens group except that the lenses of the third lens group are arranged and faced in the opposite direction to said second lens group, said second and third lens groups being positioned symmetrically with respect to said diaphragm;
   said fourth lens group comprising an lens identical to the lens of said first lens group and faced in the opposite direction to said first lens group, said first and fourth lens groups being positioned symmetrically with respect to said diaphragm;
   said first and fourth lens groups and the diaphragm being fixed, said second and third lens groups being movable, said first through fourth lens groups being positioned symmetrically with respect to said diaphragm at an equal-size magnification ratio;
   said second and third lens groups being movable symmetrically or asymmetrically for varying the magnification ratio to move the lenses along an optical axis thereby to keep an object-to-image distance constant;
   said variable focus lens meeting the following conditions:

$$0.56f < f_2 = f_3 < 0.91f \qquad \text{(I)}$$

$$44.8 < \nu_1 = \nu_8 < 62.0 \qquad \text{(II)}$$

$$0.28f < r_6 < 0.34f \qquad \text{(III)}$$

$$0.0155f < d_6 < 0.0261f \qquad \text{(IV)}$$

$$-1.40 < b/a < -0.67 \qquad \text{(V)}$$

where f represents the combined focal length of the variable focus lens, $f_2$, $f_3$ the focal lengths of the second and third lens groups, respectively, $\nu_j$ ($j = 1 \sim 8$) the Abbe number of the jth lens from the object, $r_i$ ($i = 1 \sim 17$) the radius of curvature of the ith surface from the object (with the diaphragm surface counted), $d_i$ ($i = 1 \sim 16$) the ith surface-to-surface distance from the object, and a, b the distances, respectively, that the second and third lens groups move from the equal-size magnification ratio position to the minimum magnification ratio position (the movement toward the image is positive and the movement toward the object is negative).

* * * * *